(12) United States Patent
Sybert et al.

(10) Patent No.: US 11,926,733 B2
(45) Date of Patent: Mar. 12, 2024

(54) POLYCARBONATE COPOLYMER BLENDS, ARTICLES FORMED THEREFROM, AND METHODS OF MANUFACTURE

(71) Applicant: SABIC GLOBAL TECHNOLOGIES B.V., Bergen op Zoom (NL)

(72) Inventors: Paul Dean Sybert, Evansville, IN (US); Norimitsu Yamaguchi, Newburgh, IN (US); Jacob Lee Oberholtzer, Evansville, IN (US); James Alan Mahood, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 874 days.

(21) Appl. No.: 16/971,398

(22) PCT Filed: Feb. 21, 2019

(86) PCT No.: PCT/US2019/018941
§ 371 (c)(1),
(2) Date: Aug. 20, 2020

(87) PCT Pub. No.: WO2019/165062
PCT Pub. Date: Aug. 29, 2019

(65) Prior Publication Data
US 2020/0392331 A1   Dec. 17, 2020

(30) Foreign Application Priority Data

Feb. 21, 2018   (EP) ................................. 18157924

(51) Int. Cl.
*C08L 69/00*   (2006.01)
*C08G 73/10*   (2006.01)
(Continued)

(52) U.S. Cl.
CPC ........ *C08L 69/005* (2013.01); *C08G 73/1071* (2013.01); *C08K 5/0066* (2013.01);
(Continued)

(58) Field of Classification Search
CPC .... C08L 69/005; C08L 79/08; C08L 2201/10; C08L 2205/025; C08L 2205/03;
(Continued)

(56) References Cited

U.S. PATENT DOCUMENTS 3,030,331 A   4/1962  Goldberg
4,189,549 A   2/1980  Matsunaga et al.
(Continued)

FOREIGN PATENT DOCUMENTS

WO   2007081536 A1   7/2007
WO   2013175448 A1   11/2013
(Continued)

OTHER PUBLICATIONS

Machine Translation of Chinese Office Action for Application 201980011079.9 dated Jun. 6, 2022, 6 pages.
(Continued)

*Primary Examiner* — Shane Fang
(74) *Attorney, Agent, or Firm* — CANTOR COLBURN LLP

(57) ABSTRACT

A polymer blend including 5 to 95 weight percent of a poly(ester-carbonate-carbonate) comprising 40 to 95 mole percent of ester units comprising low heat bisphenol groups and high heat bisphenol groups, wherein the ester units comprise 20 to 80 mole percent of the low heat bisphenol groups and 20 to 80 mole percent of the high heat bisphenol groups, based on the total moles of ester units in the poly(ester-carbonate-carbonate), and 5 to 60 mole percent of carbonate units comprising the low heat bisphenol groups and the high heat bisphenol groups, wherein the carbonate
(Continued)

units comprise 20 to 80 mole percent of the low heat bisphenol groups and 20 to 80 mole percent of the high heat bisphenol groups, based on the total moles of carbonate units in the poly(ester-carbonate-carbonate); and 5 to 95 weight percent of a poly(etherimide), wherein the weight percent of each polymer is based on the total weight of the polymers in the blend, and a molded 0.125-inch thick ASTM tensile bar comprising the polymer blend has a haze value of less than 25% as determined according to ASTM D1003 using the color space CIE1931 with Illuminant C and a 2° observer.

19 Claims, 1 Drawing Sheet

(51) Int. Cl.
*C08K 5/00* (2006.01)
*C08K 5/3417* (2006.01)
*C08K 5/42* (2006.01)
*C08L 79/08* (2006.01)

(52) U.S. Cl.
CPC .............. *C08K 5/3417* (2013.01); *C08K 5/42* (2013.01); *C08L 79/08* (2013.01); *C08L 2201/10* (2013.01); *C08L 2205/025* (2013.01); *C08L 2205/03* (2013.01)

(58) Field of Classification Search
CPC ............. C08G 73/1071; C08K 5/0066; C08K 5/3417; C08K 5/42
See application file for complete search history.

(56) References Cited

U.S. PATENT DOCUMENTS

| | | | |
|---|---|---|---|
| 4,465,820 A | 8/1984 | Miller et al. | |
| 4,816,527 A | 3/1989 | Rock | |
| 7,354,986 B2 | 4/2008 | Mahood et al. | |
| 7,365,124 B2 | 4/2008 | Srinivasan et al. | |
| 7,408,016 B2 | 8/2008 | Chatterjee et al. | |
| 7,495,066 B2 | 2/2009 | Balikrishnan et al. | |
| 7,790,292 B2 | 9/2010 | Colborn et al. | |
| 8,318,891 B2 | 11/2012 | Balakrishnan et al. | |
| 8,487,065 B2 | 7/2013 | Mahood et al. | |
| 8,669,315 B2 | 3/2014 | Gallucci et al. | |
| 9,193,829 B2 | 11/2015 | Ordonez et al. | |
| 2006/0264581 A1 | 11/2006 | Berkstresser et al. | |
| 2008/0269400 A1* | 10/2008 | Chakravarti | C08L 67/02 525/419 |
| 2009/0088504 A1 | 4/2009 | Chatterjee et al. | |
| 2009/0131599 A1 | 5/2009 | Rai et al. | |
| 2010/0286358 A1* | 11/2010 | Mahood | C08G 63/64 528/201 |
| 2014/0061533 A1 | 3/2014 | Schultz Hume et al. | |
| 2014/0063831 A1* | 3/2014 | Lowery | C08L 69/00 524/106 |
| 2014/0295363 A1 | 10/2014 | Sun et al. | |
| 2016/0060403 A1* | 3/2016 | Mahood | C08L 69/00 264/495 |
| 2016/0326366 A1* | 11/2016 | Sybert | C08L 79/08 |
| 2017/0084394 A1 | 3/2017 | Sanner et al. | |
| 2019/0127574 A1* | 5/2019 | Farrell | C08L 69/005 |

FOREIGN PATENT DOCUMENTS

| | | |
|---|---|---|
| WO | 2014072923 A1 | 5/2014 |
| WO | 2015106204 A1 | 7/2015 |
| WO | 2016028960 A1 | 2/2016 |
| WO | 2017003809 A1 | 1/2017 |
| WO | 2017187424 A1 | 11/2017 |
| WO | 2017187428 A1 | 11/2017 |
| WO | 2017187430 A1 | 11/2017 |

OTHER PUBLICATIONS

European Search Report for European Application No. 18157924.4, dated Apr. 13, 2018, 9 pages.
International Search Report for International Application No. PCT/US2019/018941, International Filing Date Feb. 21, 2019, dated Apr. 5, 2019, 6 pages.
UL 94, "Tests for Flammability of Plastic Materials for Parts in Devices and Appliances", Underwriters Laboratories, Inc. (UL), Dec. 12, 2003, 52 pages.
Written Opinion for International Application No. PCT/US2019/018941, International Filing Date Feb. 21, 2019, dated Apr. 5, 2019, 10 pages.

* cited by examiner

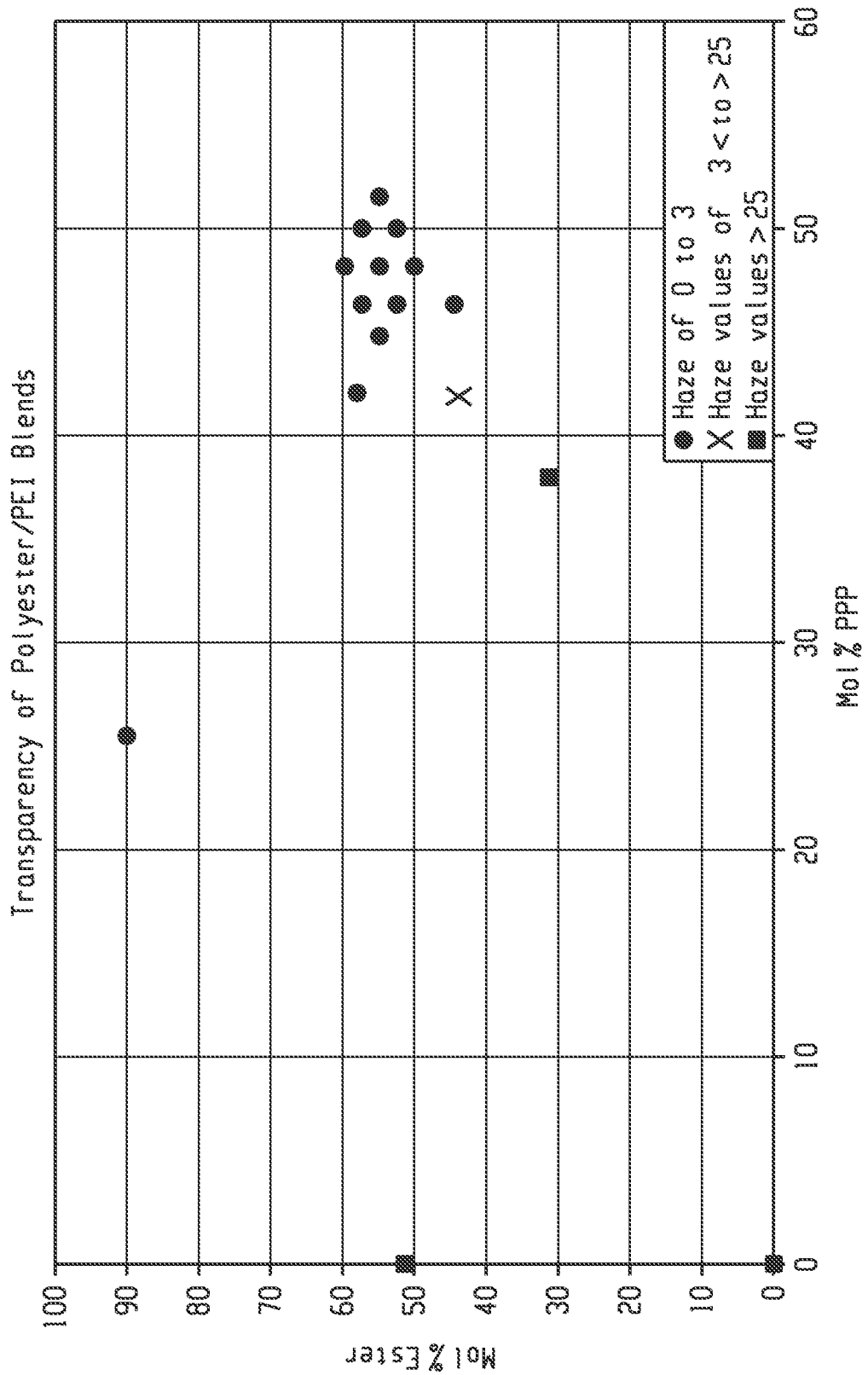

POLYCARBONATE COPOLYMER BLENDS, ARTICLES FORMED THEREFROM, AND METHODS OF MANUFACTURE

CROSS REFERENCE TO RELATED APPLICATIONS

This application is a National Stage application of PCT/US2019/018941, filed Feb. 21, 2019, which claims the benefit of European Application No. 18157924.4, filed Feb. 21, 2018, both of which are incorporated by reference in their entirety herein.

BACKGROUND

This disclosure is directed to blends containing polycarbonate copolymers, compositions including the blends, articles formed therefrom, and their methods of manufacture, and in particular blends containing poly(ester-carbonate-carbonate)s and compositions and articles formed therefrom.

Polycarbonate copolymers and their blends are useful in the manufacture of articles and components for a wide range of applications, from automotive parts to electronic appliances. Because of their broad use, particularly in automotive, lighting and consumer electronics industries, it is desirable to provide compositions having high thermal resistance, for example from 100 to 150° C., or higher. It would be a further advantage if the compositions were transparent, and had good impact and other physical properties.

SUMMARY

A polymer blend, comprises: 5 to 95 weight percent of a poly(ester-carbonate-carbonate) comprising 40 to 95 mole percent of ester units comprising low heat bisphenol groups and high heat bisphenol groups, wherein the ester units comprise 20 to 80 mole percent of the low heat bisphenol groups and 20 to 80 mole percent of the high heat bisphenol groups, based on the total moles of ester units in the poly(ester-carbonate-carbonate), and 5 to 60 mole percent of carbonate units comprising the low heat bisphenol groups and the high heat bisphenol groups, wherein the carbonate units comprise 20 to 80 mole percent of the low heat bisphenol groups and 20 to 80 mole percent of the high heat bisphenol groups, based on the total moles of carbonate units in the poly(ester-carbonate-carbonate); and 5 to 95 weight percent of a poly(etherimide), wherein the weight percent of each polymer is based on the total weight of the polymers in the blend, and a molded 0.125-inch thick ASTM tensile bar comprising the polymer blend has a haze value of less than 25% as determined according to ASTM D1003 using the color space CIE1931 with Illuminant C and a 2° observer.

A method of making the polymer blend is disclosed, as well as articles comprising the polymer blend.

The invention is further illustrated by the following drawing, detailed description, examples and claims.

BRIEF DESCRIPTION OF THE DRAWING

The FIGURE a graph showing the result of varying the mole percent of ester units on transparency.

DETAILED DESCRIPTION

Blends of specific polycarbonate copolymers with polyetherimides provide compositions having good thermal resistance and adhesion to metal. In particular, use of two types of monomers in the ester units and the carbonate units in the polycarbonate copolymer, as well as the careful selection of relative percentage of units and the ester units, can provide blends with high heat resistance, good surface properties, and desirable melt viscosity. The blends can further have improved modulus and lower coefficient of thermal expansion (CTE) than the poly(ester-carbonates) alone. The discovery allows the manufacture of compositions suitable for use in articles with high thermal resistance and improved adhesion to metal. Blends having low haze can be provided.

It has been unexpectedly found that these advantages can be attained using polycarbonate copolymers that contain ester units and carbonate units containing both low heat bisphenol groups and high heat bisphenol groups. The low heat bisphenol groups have from 12 to 15 carbon atoms. The high heat bisphenol groups include specific monomers having 16 or more carbon atoms. Since at least the carbonate units are derived from two or more two different bisphenols, the polycarbonate copolymers are referred to herein as poly(ester-carbonate-carbonate)s.

In particular, the poly(ester-carbonate-carbonate)s include the ester units of formula (1)

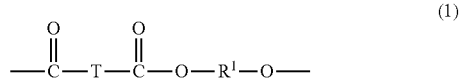

and carbonate units of formula (2)

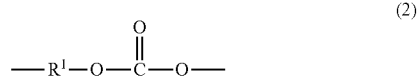

wherein the variables T and $R^1$ are further described below.

In formula (1), T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Preferably, T is a $C_{6-20}$ divalent aromatic group such as a divalent isophthaloyl group, a divalent terephthaloyl group, or a combination thereof. Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalene dicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. Aliphatic dicarboxylic acids that can be used to prepare the polyester units include a linear $C_{6-20}$ aliphatic dicarboxylic acid (which includes a reactive derivative thereof), preferably a linear $C_6$-$C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA).

Further in formulas (1) and (2), each $R^1$ are each independently (a) a $C_{12-16}$ low heat bisphenol divalent group and (b) a $C_{17}$ or higher divalent group derived from a high heat monomer as further described below. In an embodiment, $R^1$ each independently consist essentially, or consist of, (a) a bisphenol A divalent group and (b) a $C_{19}$ or higher divalent group derived from a high heat monomer as further described below.

The low heat bisphenol group can be of formula (3)

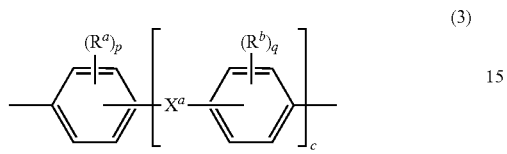

(3)

wherein $R^a$ and $R^b$ are each independently a halogen, $C_{1-3}$ alkoxy, or $C_{1-3}$ alkyl, c is 0 to 4, and p and q are each independently integers of 0 or 1. In an embodiment, p and q is each 0, or p and q is each 1 and $R^a$ and $R^b$ are each a methyl, disposed meta to the hydroxy group on each arylene group. $X^a$ in formula (3) is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-6}$ organic group, which can be cyclic or acyclic, aromatic or non-aromatic, and can further comprise heteroatoms such as halogens, oxygen, nitrogen, sulfur, silicon, or phosphorous. For example, $X^a$ can be a $C_{3-6}$ cycloalkylidene, a $C_{1-6}$ alkylidene of the formula —C($R^c$)($R^d$)— wherein $R^c$ and $R^d$ are each independently hydrogen, $C_{1-5}$ alkyl, or a group of the formula —C(=$R^e$)— wherein $R^e$ is a divalent $C_{1-5}$ hydrocarbon group. Some illustrative examples of dihydroxy compounds that can be used are described, for example, in WO 2013/175448 A1, US 2014/0295363, and WO 2014/072923.

In an embodiment, the low heat monomer is bisphenol A, which provides the low heat group of formula (3a).

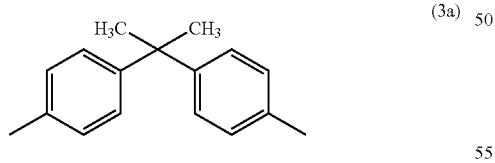

(3a)

The high heat bisphenol group is derived from a high heat bisphenol monomer having at least 19 carbon atoms. As used herein, a high heat bisphenol monomer is a monomer where the corresponding homopolycarbonate of the monomer has a glass transition temperature (Tg) of 155° C. or higher. Examples of such high heat bisphenol groups include groups of formulas (4) to (11)

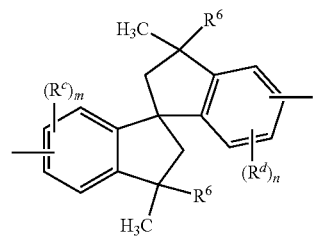

(4)

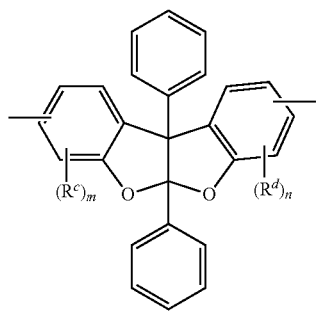

(5)

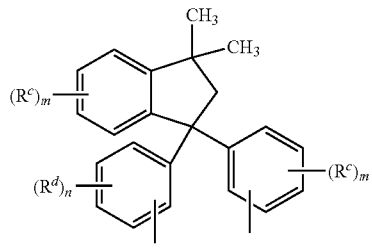

(6)

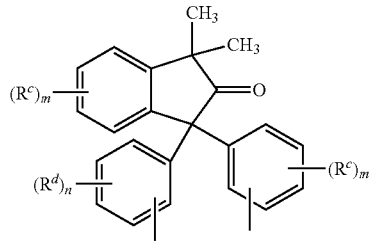

(7)

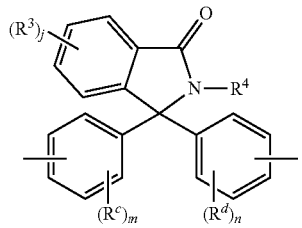

(8)

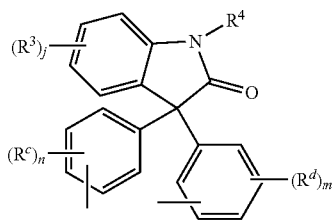

(9)

-continued

(10)
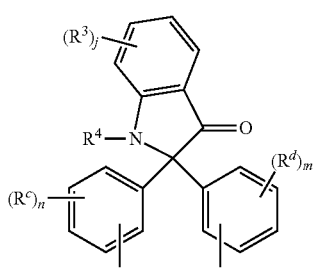

(11)
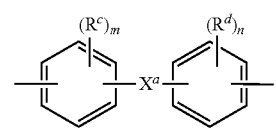

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^3$ is independently $C_{1-6}$ alkyl, $R^4$ is hydrogen, $C_{1-6}$ alkyl, or phenyl optionally substituted with 1 to 5 $C_{1-6}$ alkyl groups, $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^a$)$_x$-G-($Q^b$)$_y$ group, wherein $Q^a$ and $Q^b$ are each independently a $C_{1-3}$ alkylene, G is a $C_{3-10}$ cycloalkylene, x is 0 or 1, and y is 0 or 1, and j, m, and n are each independently 0 to 4. A combination of high heat bisphenol groups can be used.

In an embodiment, $R^c$ and $R^d$ are each independently a $C_{1-3}$ alkyl, or $C_{1-3}$ alkoxy, each $R^6$ is methyl, each $R^3$ is independently $C_{1-3}$ alkyl, $R^4$ is hydrogen, methyl, or phenyl, each $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^1$)$_x$-G-($Q^2$)$_y$ group, wherein $Q^1$ and $Q^2$ are each independently a $C_{1-3}$ alkylene and G is a $C_{3-10}$ cycloalkylene, x is 0 or 1, and y is 0 or 1, and j, m, and n are each independently 0 or 1.

Exemplary high heat bisphenol groups include those of formulas (11a) to (11k) and (8a)

(11a)
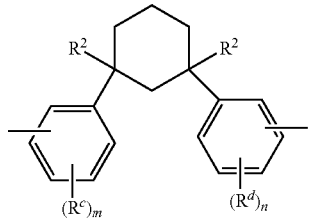

(11b)
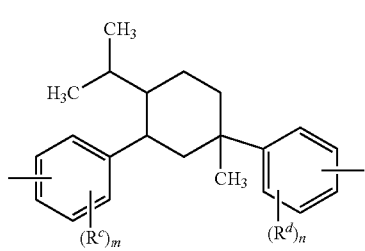

(11c)
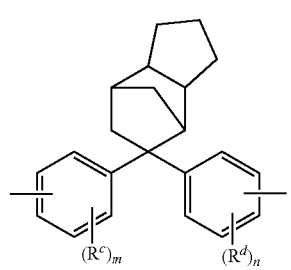

(11d)
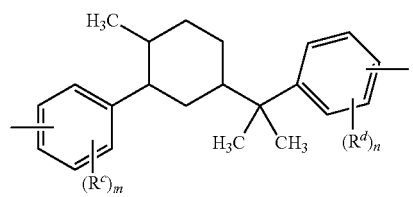

(11e)
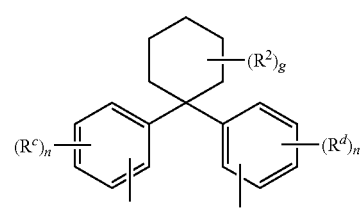

(11f)
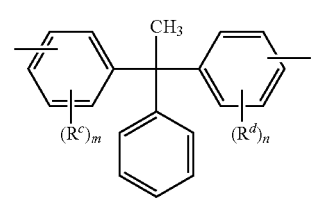

(11g)
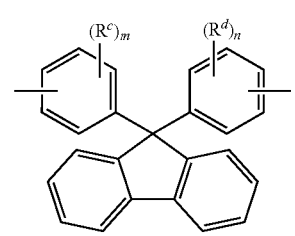

(11h)
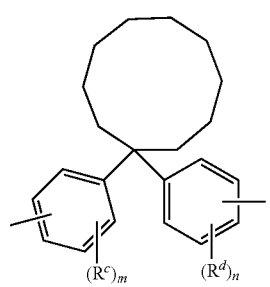

-continued

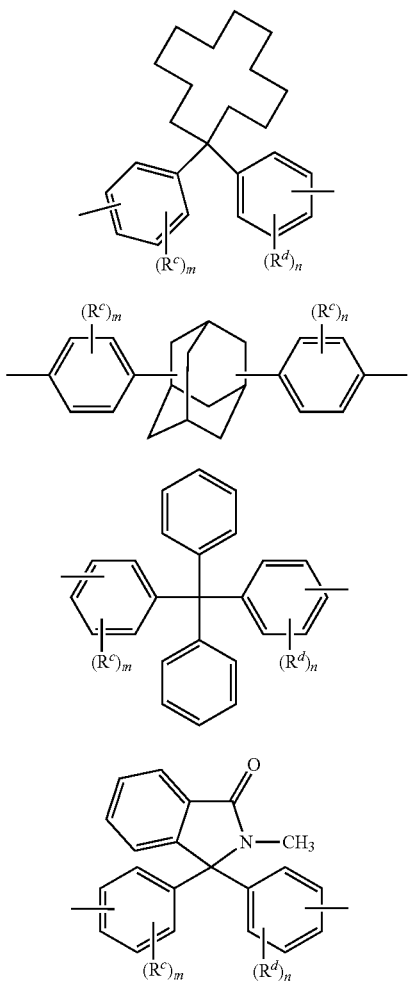

(11i)

(11j)

(11k)

(8a)

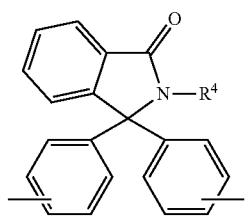

wherein $R^c$ and $R^d$ are the same as defined for formulas (4) to (11), each $R^2$ is independently hydrogen or $C_{1-4}$ alkyl, m and n are each independently 0 to 4, each $R^3$ is independently $C_{1-4}$ alkyl or hydrogen, $R^4$ is $C_{1-6}$ alkyl, or phenyl optionally substituted with 1 to 5 $C_{1-6}$ alkyl groups, and g is 0 to 10. In a specific embodiment each bond of the divalent group is located para to the linking group that is $X^a$. In an embodiment, $R^c$ and $R^d$ are each independently a $C_{1-3}$ alkyl, or $C_{1-3}$ alkoxy, each $R^2$ is methyl, $R^4$ is $C_{1-6}$ alkyl or phenyl, x is 0 or 1, y 1, and m and n are each independently 0 or 1.

The high heat bisphenol group is preferably of formula (8b)

(8b)

wherein $R^4$ is methyl, or phenyl. Preferably, the high heat bisphenol group is derived from 2-phenyl-3,3'-bis(4-hydroxyphenyl) phthalimidine (PPPBP) or 1,1-bis(4-hydroxyphenyl)-3,3,5-trimethyl-cyclohexane (BP-TMC).

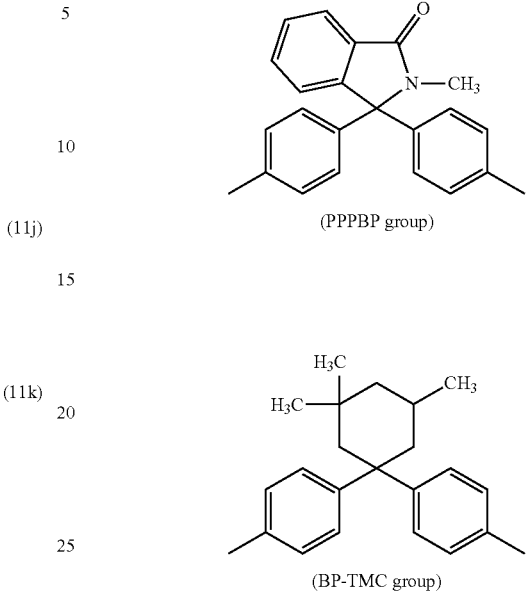

(PPPBP group)

(BP-TMC group)

The $C_{16}$ or higher divalent group (b) is present in an amount of 40 mol % to 50 mol %, based on the total moles of the bisphenol A divalent groups (a) and the $C_{16}$ or higher divalent groups (b).

The ester units of the poly(ester-carbonate-carbonate)s are present in an amount of 40 mol % to 60 mol % based on the sum of the moles of the carbonate units and the ester units.

The poly(ester-carbonate-carbonate)s can be manufactured by processes such as interfacial polymerization and melt polymerization, which are known, and are described, for example, in U.S. Pat. Nos. 3,030,331; 4,189,549; 8,318,891; WO 2013/175448; and WO 2014/072923. Synthesis generally proceeds from the corresponding bisphenols.

In an embodiment, the low heat bisphenol monomer is of formula (12)

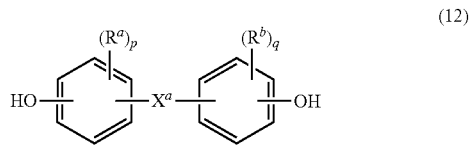

(12)

wherein $R^a$, $R^b$, $X^a$, p, and q are as defined in formula (3). Preferably the low heat bisphenol monomer bisphenol A (12a).

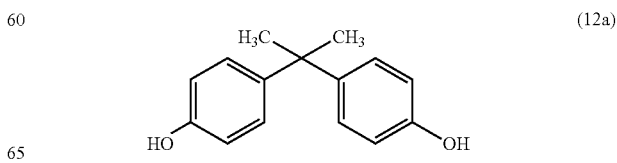

(12a)

The high heat bisphenol monomers can be of formulas (13) to (20)
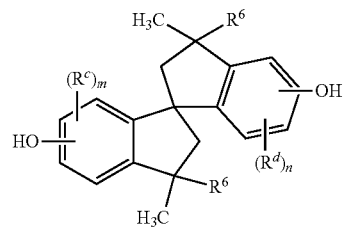
(13)
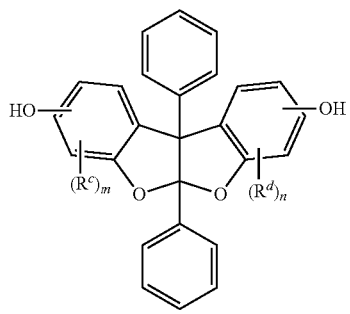
(14)
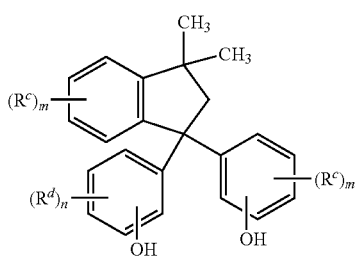
(15)
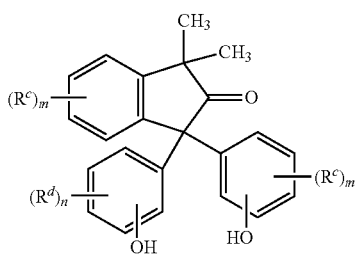
(16)
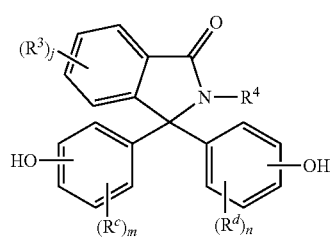
(17)
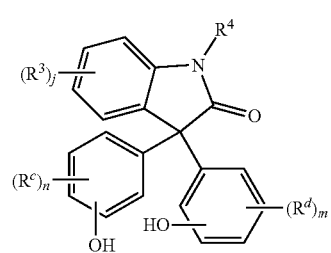
(18)
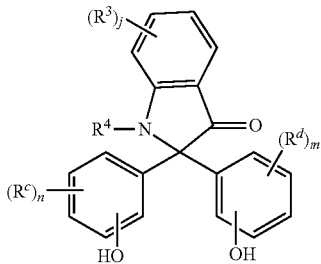
(19)
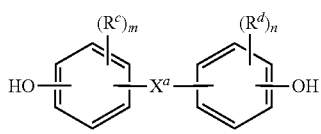
(20)
wherein $R^c$, $R^d$, $R^3$, $R^4$, $R^6$, m, and n are the same as defined herein for formulas (4) to (11). Exemplary high heat bisphenol monomers include those of formula (17a) and (20a) to (20k)
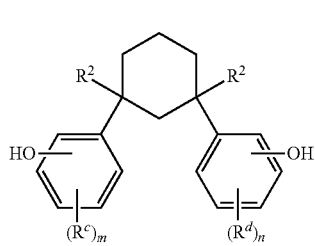
(20a)
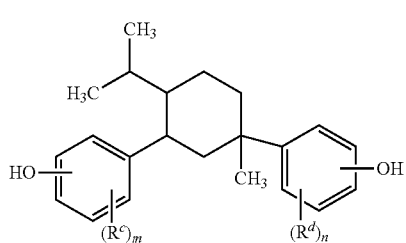
(20b)
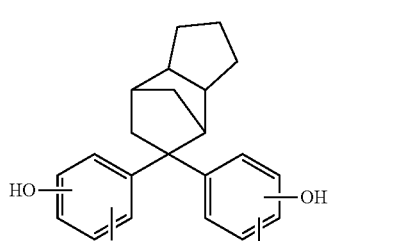
(20c)
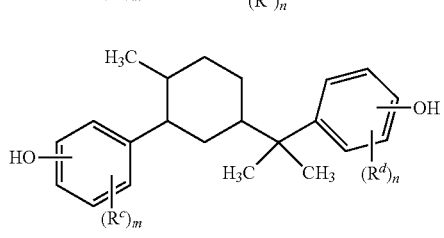
(20d)

(20e) 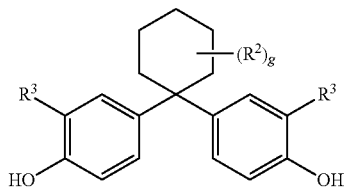

(20f) 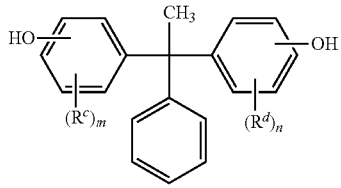

(20g) 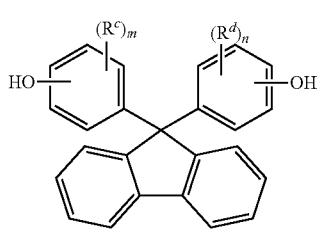

(20h) 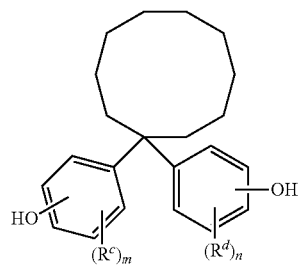

(20i) 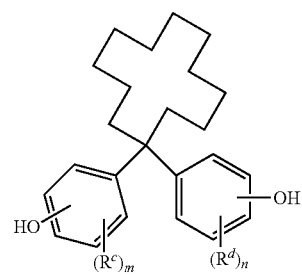

(20j) 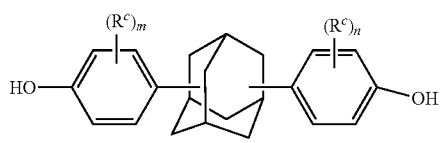

(20k) 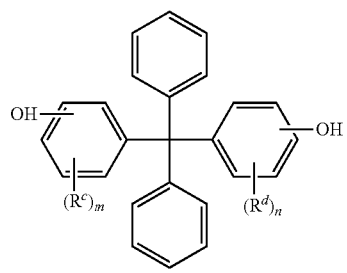

(17a) 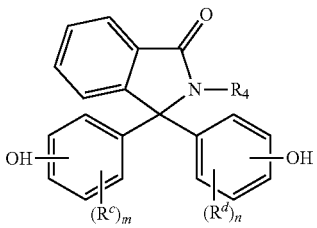

wherein $R^c$ and $R^d$ are the same as defined for formulas (13) to (20), each $R^2$ is independently hydrogen or $C_{1-4}$ alkyl, m and n are each independently 0 to 4, each $R^3$ is independently $C_{1-4}$ alkyl or hydrogen, $R^4$ is $C_{1-6}$ alkyl, or phenyl optionally substituted with 1 to 5 $C_{1-6}$ alkyl groups, and g is 0 to 10. In a specific embodiment each bond of the divalent group is located para to the linking group that is $X^a$. In an embodiment, $R^c$ and $R^d$ are each independently a $C_{1-3}$ alkyl, or $C_1$. 3 alkoxy, each $R^2$ is methyl, each $R^3$ is methyl, $R^4$ is $C_{1-6}$ alkyl, or phenyl, g is 0 to 4, and m and n are each independently 0 or 1. Preferably, the high heat bisphenol monomers is 2-phenyl-3,3'-bis(4-hydroxyphenyl) phthalimidine (PPPBP) or 1,1-bis(4-hydroxyphenyl)-3,3,5-trimethyl-cyclohexane (BP-TMC).

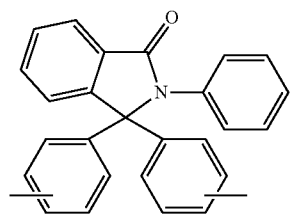
(PPPBP)

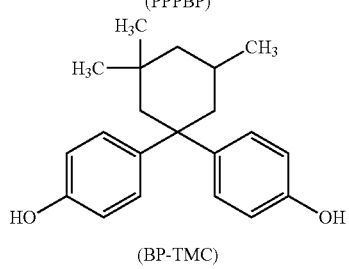
(BP-TMC)

The poly(ester-carbonate-carbonate)s, can also be manufactured as described in U.S. Pat. No. 8,487,065, such as in Example 7. In particular, the poly(ester-carbonate-carbonate)s can be manufactured by interfacial polymerization. Although the reaction conditions for interfacial polymerization can vary, an exemplary process generally involves dissolving or dispersing the dihydroxy compound and diacid compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10. Rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The water-immiscible solvent can be, for example, methylene chloride, 1,2-dichloroethane, chlorobenzene, toluene, and the like. Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used.

The diaryl carbonate ester can be diphenyl carbonate, or an activated diphenyl carbonate having electron-withdrawing substituents on the each aryl, such as bis(4-nitrophenyl) carbonate, bis(2-chlorophenyl)carbonate, bis(4-chlorophenyl)carbonate, bis(methyl salicylate)carbonate, bis(4-methylcarboxylphenyl) carbonate, bis(2-acetylphenyl) carboxylate, bis(4-acetylphenyl) carboxylate, or a combination comprising at least one of the foregoing.

In some embodiments, the poly(ester-carbonate-carbonate)s are prepared by providing a slurry of the low heat bisphenol monomer and the phase transfer catalyst in a mixture of the water and water-immiscible organic solvent; and co-feeding the acid halide of the dicarboxylic acid, the high heat bisphenol monomer, or a combination comprising at least one of the foregoing, in a solution of caustic to provide polyester oligomers, which are then reacted with the carbonate precursor. In particular, the process includes combining low heat bisphenol monomer, such as bisphenol A, in a water-immiscible organic solvent such as methylene chloride, and water in the presence of an endcapping agent as described below and a phase transfer catalyst such as triethylamine in a reactor. A caustic such as NaOH or KOH is added together with a solution of the high heat bisphenol monomer, such as PPPBP in caustic (e.g., aqueous NaOH or KOH), while a mixture of molten diacid halide derived from the corresponding dicarboxylic acid of T (e.g., isophthaloyl and terephthaloyl chloride) are concurrently added. Aqueous caustic can be added as needed to prevent the pH from decreasing below 8-9 in the reactor. After the additions are complete, a carbonyl source such as phosgene is added with sufficient aqueous caustic to maintain a pH of 8-9 in the reactor. The progress of the reaction is monitored (e.g., by GPC), and additional carbonyl source added as needed until the reaction has proceeded to the desired degree of completion. The resulting poly(ester-carbonate-carbonate)s can be isolated and purified by methods known in the art. For example, the poly(ester-carbonate-carbonate)s, can by purified on a centrifuge train where the brine phase is separated and the polymer solution in methylene chloride is extracted with aqueous HCl and then washed with deionized water until titratable chlorides are at a desired level, for example less than 50, or less than 5 ppm. The methylene chloride solution can then be steam precipitated and the polymer dried, for example under hot nitrogen, until the desired volatile levels are obtained, for example less than 1 wt % or less than 0.4 wt %.

As described above, an end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumylphenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polymers can be prepared by adding a branching agent during polymerization, for example trimellitic acid, trimellitic anhydride, trimellitic trichloride, tris-p-hydroxyphenylethane, isatin-bisphenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %.

In an embodiment, the ester units of the poly(ester-carbonate-carbonate) comprise the low heat bisphenol groups and at least one high heat bisphenol group as $R^1$. For example, 20 to 35 mol % of the $R^1$ groups in the ester are high heat bisphenol groups, based on the total moles of the $R^1$ groups of the ester units.

The poly(ester-carbonate-carbonate) can comprise 40 to 95 mole percent of ester units comprising low heat bisphenol groups and high heat bisphenol groups, and 5 to 60 mole percent of carbonate units comprising the low heat bisphenol groups and the high heat bisphenol groups.

The poly(ester-carbonate-carbonate) can comprise ester and carbonate units that each comprises 20 to 80 mole percent of the low heat bisphenol groups and 20 to 80 mole percent of the high heat bisphenol groups, based on the total moles of ester and carbonate units in the poly(ester-carbonate-carbonate). The poly(ester-carbonate-carbonate) can comprise a carbonate linkage between two of the high heat bisphenol groups in an amount of 15 to 50 mol % based on the total moles of the carbonate linkages as determined by carbon-13 nuclear magnetic resonance spectroscopy (13C NMR) or proton nuclear magnetic resonance spectroscopy (1H NMR). The poly(ester-carbonate-carbonate) can also comprise a carbonate linkage between two of the high heat bisphenol groups of 15 to 40 mol %, based on the total moles of the carbonate linkages as determined by 13C NMR or 1H NMR. In another embodiment, the poly(ester-carbonate-carbonate)s can comprise a carbonate linkage between a low heat bisphenol group and a high heat bisphenol group in an amount of 20 to 60 mol %, or in an amount of 30 to 50 mol %, each based on the total moles of the carbonate linkages as determined by 13C NMR or 1H NMR.

The poly(ester-carbonate-carbonate)s can have a weight average molecular weight (Mw) of 18,000 to 24,000 grams/mole (g/mol), as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

The poly(ester-carbonate-carbonate)s form a compatible blend with polyetherimides to provide polymer blends that can have an advantageous combination of properties. The polyetherimides can comprise more than 1, for example 10 to 1000, or 10 to 500, structural units of formula (18)

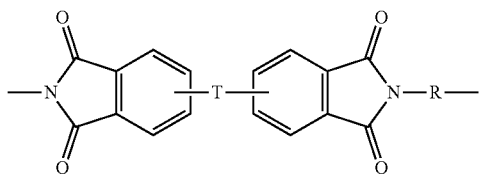

(18)

wherein each R is independently the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of one or more of the following formulae (19)

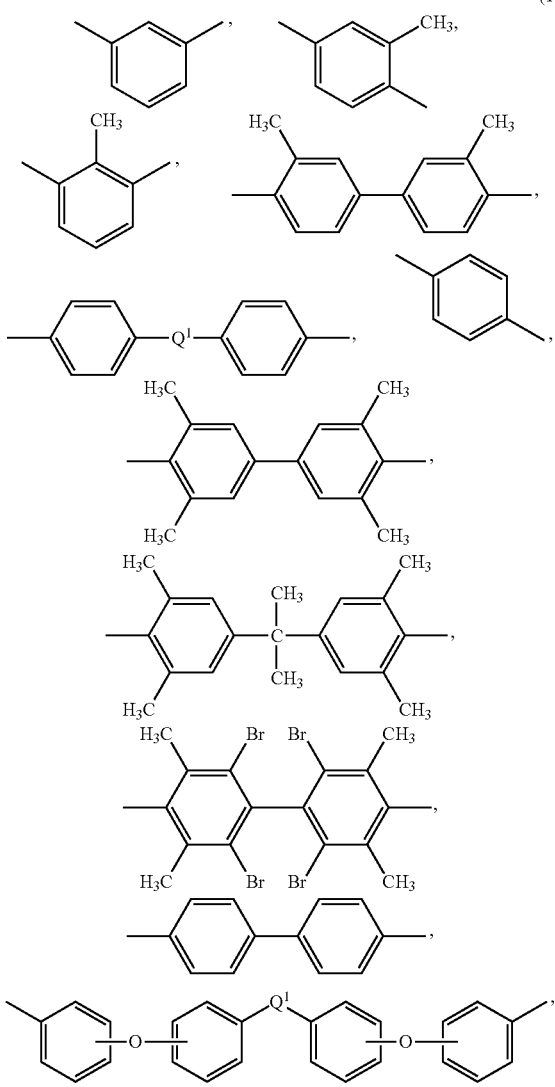

(19)

wherein —O—, —S—, —C(O)—, —SO$_2$—, —SO—, —P(R$^d$)(=O)— wherein R$^d$ is a $C_{1-8}$ alkyl or $C_{6-12}$ aryl, —C$_y$H$_{2y}$— wherein y is an integer from 1 to 5, or —(C$_6$H$_{10}$)$_z$— wherein z is an integer of 1 to 4. In an embodiment R is m-phenylene, p-phenylene, or a diaryl sulfone, in particular bis(4,4'-phenylene)sulfone.

Further in formula (3), T is —O— or a group of the formula —O—Z—O— wherein the divalent bonds of the —O— or the —O—Z—O— group are in the 3,3',3,4',4,3', or the 4,4' positions. Exemplary groups Z include groups of formula (3) as described above. A specific example of a group Z is a divalent group of formula (3b)

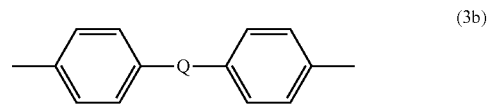

(3b)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3b) is 2,2-isopropylidene.

In an embodiment in formula (3), R is m-phenylene or p-phenylene and T is —O—Z—O— wherein Z is a divalent group of formula (3b). Alternatively, R is m-phenylene or p-phenylene and T is —O—Z—O wherein Z is a divalent group of formula (13b) and Q is 2,2-isopropylidene.

In some embodiments, the polyetherimide can be a copolymer, for example, a polyetherimide sulfone copolymer comprising structural units of formula (18) wherein at least 50 mole % of the R groups are of formula

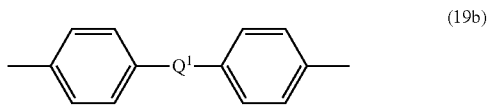

(19b)

wherein Q$^1$ is —SO$_2$— and the remaining R groups are independently p-phenylene or m-phenylene or a combination comprising at least one of the foregoing; and Z is 2,2'-(4-phenylene)isopropylidene.

Alternatively, the polyetherimide copolymer optionally comprises additional structural imide units, for example imide units of formula (18) wherein R is as described in formula (18) and T is a linker of the formulas

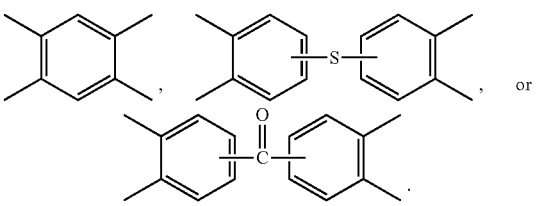

These additional structural imide units can be present in amounts from 0 to 10 mole % of the total number of units, or 0 to 5 mole %, or 0 to 2 mole %. In an embodiment no additional imide units are present in the polyetherimide.

The polyetherimide can be prepared by any of the methods well known to those skilled in the art, including the reaction of an aromatic bis(ether anhydride) of formula (20) or a chemical equivalent thereof, with an organic diamine of formula (21)

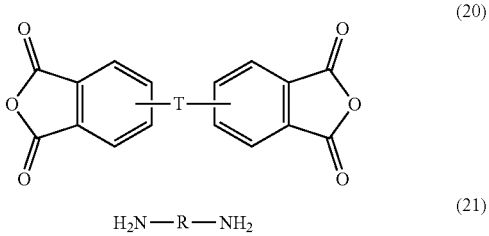

(20)

H₂N—R—NH₂ (21)

wherein T and R are defined as described in formula (18). Copolymers of the polyetherimides can be manufactured using a combination of an aromatic bis(ether anhydride) of formula (20) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The polyetherimides can have a melt index of 0.1 to 10 grams per minute (g/min), as measured by American Society for Testing Materials (ASTM) D1238 at 340 to 370° C., using a 6.7 kg weight. In some embodiments, the polyetherimide polymer has an Mw of 1,000 to 150,000 g/mol as measured by GPC using polystyrene standards. In some embodiments the polyetherimide has an Mw of 10,000 to 80,000 g/mol. Such polyetherimide polymers typically have an intrinsic viscosity greater than 0.2 dl/g, or 0.35 to 0.7 dl/g as measured in m-cresol at 25° C.

Polymer blends containing the poly(ester-carbonate-carbonate) and the polyetherimide can further include various additives ordinarily incorporated into polymer blends of this type, with the proviso that the additive(s) are selected so as to not significantly adversely affect the desired properties of the polymer blend, in particular melt flow, thermal, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt %, based on the total weight of the polymer blend.

In addition to the poly(ester-carbonate-carbonate) and the polyetherimide, the polymer blends can further comprise a different polymer, for example a polycarbonate homopolymer such as a bisphenol A homopolycarbonate, a copolycarbonate, a second poly(ester-carbonate-carbonate) that is different from the poly(ester-carbonate-carbonate), or a combination comprising at least one of the foregoing, provided that such polymer does not significantly adversely affect the compatibility of the polymer blend as described below, or other desired property, such as an impact property. The other polymer can be present in an amount of 0.1 to 10 wt %, or 0.5 to 5 wt % based on the total weight of the polymer blend.

The polymer blends can be manufactured by various methods known in the art. For example, powdered poly (ester-carbonate-carbonate), and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

As stated above, it has unexpectedly been found that the poly(ester-carbonate-carbonate)s can form compatible polymer blends with the polyetherimides. Compatible blends have fine, well-dispersed domains of stable morphology.

Although there are several techniques for measuring size of the domains, the level of haze is often a good indicator of compatibility because samples with domain sizes approaching the wavelength of light transition from opaque to hazy to transparent. Blends that are opaque or have a high degree of haze often have unstable morphologies. High levels of haze and or unstable haze have poor colorability. When molded the appearance of surface will show flow lines depending on the melt flow patterns in part. Blends that have a high degree of haze can also have lower gloss levels, or can have gloss levels that vary across the part depending on the flow patterns, which can be even more disadvantageous. The variation in gloss levels can be especially deleterious for metallized surface. The reflective metalized surface is negatively impacted by the both the haze level and variation in haze levels across the part. For many applications, desirable compatible blends are referred to as miscible blends and have one or two Tgs with haze values less than 25%. Compatible blends with one or two Tgs with haze values of less than 20% are more preferred. Compatible blends with one Tg and haze values of less than 10% are still more preferred. In preferred embodiments, compatible blends with one Tg and a haze value of less than 25%, or less than 20%, or less than 20% are most preferred. For example, compatible blends can be formed when the poly(ester-carbonate-carbonate) and the polyetherimide have a weight ratio of from 4:1 to 1:2, and a multiplication product of the mole percent of the ester units and the mole percent of the high heat monomer groups in the poly(ester-carbonate-carbonate) is greater than 2000, or the poly(ester-carbonate-carbonate) and the polyetherimide have a weight ratio of greater than 4:1 or less than 1:2, and a multiplication product of the mole percent of the ester units and the mole percent of the high heat monomer groups in the poly(ester-carbonate-carbonate) is greater than or equal to 1800. As used herein, the high heat monomer groups in the poly(ester-carbonate-carbonate) include the high heat monomer groups in both the carbonate units and the ester units.

In some embodiments, the polymer blend has two Tgs and a molded sample comprising the polymer blend can have a haze of less than 25% and a transmission greater than 75%, each measured using the color space CIE1931 with Illuminant C and a 2° observer as measured on a molded 0.125-inch thick ASTM tensile bar. In other embodiments, the polymer blend has two Tgs and a molded sample comprising the polymer blend can have a haze of less than 20%, or less than 10% measured using the color space CIE1931 with Illuminant C and a 2° observer as measured on a molded 0.125-inch thick ASTM tensile bar. In another embodiment, the polymer blend has one Tg and a molded sample comprising the polymer blend can have a haze of less than 25% and a transmission greater than 75%, each measured using the color space CIE1931 with Illuminant C and a 2° observer as measured on a molded 0.125-inch thick ASTM tensile bar. In other embodiments, the polymer blend has one Tg and a haze of less than 20%, or less than 10% measured using the color space CIE1931 with Illuminant C and a 2° observer as measured on a molded 0.125-inch thick ASTM tensile bar.

In still other embodiments, the polymer blend can have two Tgs and a molded sample comprising the polymer blend can have a haze of less than 10%, or less than 3% determined on a measured according to ASTM D1003 using the color space CIE1931 with Illuminant C and a 2° observer at a 0.125-inch thick thickness; and greater than or equal to 70% transmission determined according to ASTM D1003 using the color space CIE1931 with Illuminant C and a 2° observer at a 0.125-inch thickness. Alternatively, the polymer blend can have one Tg a molded sample comprising the polymer blend can have a haze of less than 10%, or less than 3% determined on a measured according to ASTM D1003 using the color space CIE1931 with Illuminant C and a 2° observer at a 0.125-inch thick thickness; and greater than or equal to 70% transmission determined according to ASTM D1003 using the color space CIE1931 with Illuminant C and a 2° observer at a 0.125-inch thickness.

In another embodiment, a multiplication product of the mole percent of the ester units and the mole percent of the high heat monomer groups in the poly(ester-carbonate-carbonate) is greater than 1800, or greater than 2000, and the polymer blend has one Tg and a molded sample comprising the polymer blend can have a haze of less than 3 and greater than or equal to 70% transmission each as determined according to ASTM D1003 using the color space CIE1931 with Illuminant C and a 2° observer at a 0.125 mm thickness.

The polymer blend can have a single glass transition temperature of 200 to 240° C. determined using scanning calorimetry according to ASTM D3418 with a 20'C/min heating rate.

The polymer blends can further have improved properties relative to each polymer alone. For example, compared to the poly(ester-carbonate-carbonate) alone, a composition comprising the polymer blend can have at least one of an improved heat deflection temperature, a higher glass transition temperature, an improved strength, or an improved modulus. Compared to the polyetherimide alone, a composition comprising the polymer blend can have at least one of a higher melt flow, or a higher impact strength.

The poly(ester-carbonate-carbonate)s can have flow properties useful for the manufacture of thin articles. Melt volume flow rate (MVR) measures the rate of extrusion of a thermoplastic through an orifice at a prescribed temperature and load. The polymer blend can have an MVR of 15 to 20 cm$^3$/10 min, preferably 10 to 30 cm$^3$/10 min, measured at 337° C. under a load of 6.7 kg in accordance with ASTM D1238-04.

The polymer blend at a given temperature such as 350° C. or 370° C., can have a melt viscosity of less than 1050 Pa·s at 644 sec$^{-1}$ and has shift in melt viscosity of less than 25% at that temperature over 30 min under a nitrogen atmosphere as measured in a small amplitude oscillatory time sweep rheology at a fixed angular frequency of 10 radians/sec, where the melt viscosity is determined in accordance with ISO 11443.

A molded sample comprising the polymer blend can have a heat deflection temperature (HDT) of 180 to 195° C., measured flat on a 80×10×4 mm bar with a 64 mm span at 0.45 MPa according to ISO 75/Bf.

A molded sample comprising the polymer blend can have a flexural modulus of greater than or equal to 2500 MPa determined using a 0.125 inch thick unannealed bar according to ASTM D790.

A molded sample comprising the polymer blend can have a coefficient of thermal expansion determined according to ASTM E-831 of 49 to 62 measured cross flow over a temperature of 23 to 150°.

A molded sample comprising the polymer blend can retain 70% to 100% of its weight average molecular weight after heating in an air circulating oven at 190° C. for 1992 hours The polymer blend can have excellent metallization properties. In an embodiment, a metalized sample of the polymer blend has a defect onset temperature that is within 20 degrees Celsius, preferably within 10 degrees Celsius of the heat deflection temperature of the poly(ester-carbonate-carbonate) where the HDT is measured flat on a 80×10×4 mm bar with a 64 mm span at 0.45 MPa according to ISO 75/Bf.

The poly(ester-carbonate-carbonate)s can have excellent metallization properties. In an embodiment, a metalized sample of the poly(ester-carbonate-carbonate) has a defect onset temperature that is within 20 degrees Celsius of the heat deflection temperature of the poly(ester-carbonate-carbonate) where the HDT is measured flat on a 80×10×4 mm bar with a 64 mm span at 0.45 MPa according to ISO 75/Bf. In another embodiment, a metalized sample of the poly(ester-carbonate-carbonate) has a defect onset temperature that is within 10 degrees Celsius of the heat deflection temperature of the poly(ester-carbonate-carbonate) where the HDT is measured flat on a 80×10×4 mm bar with a 64 mm span at 0.45 MPa according to ISO 75/Bf.

A molded sample comprising the polymer blend can have a Notched Izod Impact of 5 to 10 KJ/m$^2$, determined in accordance with ISO 180 under a load of 5.5 J at 23° C. on a sample of 3 mm thickness.

Shaped, formed, or molded articles comprising the polymer blends are also provided. Compositions comprising the polymer blends can be molded into useful shaped articles by a variety of methods, such as injection molding, extrusion, rotational molding, blow molding, and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. Additional exemplary articles include a plug, a plug housing, a switch, an electrical conductor, a connector, an electric board, a lamp holder, a lamp cover, a lamp bezel, a reflector, a signal indicator, glazing, a lens, a lens holder, a waveguide element, a collimator, a light emitting diode, a diffuser sheet, a safety pane, a film, a film laminate, a safety goggle, and a visor.

The article comprising the poly(ester-carbonate-carbonate)s or the polymer blends can be a metallized article. The metallized article comprises, for example, a substrate comprising the poly(ester-carbonate-carbonate)s, the polycarbonate blends, or polymer blends, with a metal layer disposed on the at least one side of the substrate.

The substrate can be for example, a film. The substrate can be made by molding the poly(ester-carbonate-carbonate)s or the polymer blends. The molding methods are not particularly limited, and various known molding methods can be listed, for example, injection molding, gas assist injection molding, vacuum molding, extrusion, compression molding, calendaring, rotary molding, etc. Of these, molding is usually carried out by injection molding.

The metal layer can be disposed onto the surface of the substrate with the aid of electrocoating deposition, physical vapor deposition, or chemical vapor deposition or a suitable combination of these methods. Sputtering processes can also be used. The metal layer resulting from the metallizing process (e.g., by vapor deposition) can be 0.001 to 50 micrometers (μm) thick.

A base coat can be present between the substrate and the metal layer. However, it is advantageous to form the metal layer directly on the substrate surface without forming an undercoat. The surfaces of the substrate are smooth and good gloss can be obtained even by direct metal vapor deposition without treating the substrate with primer. Moreover, the release properties of the molded substrate during injection molding are good. Accordingly, the surface properties of the molded substrate are superior without replication of mold unevenness.

Chrome, nickel, aluminum, etc. can be listed as examples of vaporizing metals. Aluminum vapor deposition is used in one embodiment as metal vapor deposition. The surface of the molded substrate can be treated with plasma, cleaned, or degreased before vapor deposition in order to increase adhesion.

The metallized article can have a protective layer disposed on the metal layer. "Protective layer" refers for example, to a layer which is made of a binder or a high molecular weight polymer and formed on the outermost (e.g., the UV blocking) layer, so as to exert the effects of preventing marring and improving mechanical properties of the multilayer article. The protective layer can be clear or pigmented and be formulated, for example, with nitrocellulose or synthetic polymers configured to quickly dry by evaporation without chemical reaction with the layer on which they are disposed, providing a solid protective layer. The protective coating material can further be thinned with alcohols. In certain applications, the thickness of the protective layer is minimized. The thickness of the protective layer can be, for example, 0.2 μm or less.

The metallized articles can have little mold shrinkage, have good surface gloss even when metal layers are directly vapor deposited, and the vapor deposited surfaces do not become cloudy or have rainbow patterns even on heating of the vapor deposited surface. In particular, the metallized article can have no surface defects visible to the eye.

Illustratively, the metallized article has a metallized surface, wherein the surface can exhibit a gloss of greater than 95 units, or greater than 170 units, measured at 20 degrees using a trigloss meter. The metallized surface can also retain 85%, 88%, 90%, 95% or more of its gloss after heat aging at 150° C. for 1 hour, measured at 20 degrees using a micro trigloss meter. A base coat (undercoat) can be present between the article and the metallized surface, or a surface of the article can be directly metallized.

Metallized articles have applications in optical reflectors and can be used for automotive headlamps, headlight extensions, and headlamp reflectors, for indoor illumination, for vehicle interior illumination and for the like.

This disclosure is further illustrated by the following non-limiting examples.

EXAMPLES

The materials used in the Examples are described in Table 1.

TABLE 1

| Component | Chemical Description | Source |
|---|---|---|
| BPA-PC | Bisphenol A homopolycarbonate | SABIC |
| PEC1 | A p-cumylphenol endcapped block poly(ester-carbonate-carbonate) with polyester blocks containing 52 mol % bisphenol A-isophthalate-co-terephthalate repeat units (50:50 isophthalate/terephthalate) and carbonate blocks containing bisphenol A carbonate units linkages; Mw = 27,000 to 29,000 g/mol; can be prepared as | |

TABLE 1-continued

| Component | Chemical Description | Source |
|---|---|---|
| | described in Control 2 of US 4,465,820 to Miller using the appropriate acid chloride mixture and p-cumylphenol in place of p-tert-butylphenol. The acid chlorides can be added in a methylene chloride solution or molten. | |
| PEC2 | A p-cumylphenol endcapped block poly(ester-carbonate-carbonate) with polyester blocks containing 74 mol % bisphenol A isophthalate-co-terephthalate repeat units (93:7 isophthalate/terephthalate) and carbonate blocks containing bisphenol A carbonate units linkages; Mw = 27,000 to 29,000 g/mol; can be prepared as described in Control 2 of US 4,465,820 to Miller using the appropriate acid chloride mixture and p-cumylphenol in place of p-tert-butylphenol. The acid chlorides can be added in a methylene chloride solution or molten. | |
| PEC3 | A p-cumylphenol endcapped block poly(ester-carbonate-carbonate) with polyester blocks containing 1,3-phenylene isophthalate-co-terephthalate repeat units and carbonate blocks containing bisphenol A carbonate and resorcinol carbonate units, having ~79-84 mol % resorcinol ester (50:50 isophthalate/terephthalate) linkages, ~7-11 mol % resorcinol carbonate linkages, and ~8 to 11 mol % bisphenol A carbonate linkages; Mw = 19,000 to 21,000 g/mol; can be prepared as described in Comparative Example 2-4 of US 7790292 to Colborn. | SABIC |
| PEC4 | A p-cumylphenol endcapped block poly(ester-carbonate-carbonate) with polyester blocks containing 1,3-phenylene isophthalate-co-terephthalate repeat units and carbonate blocks containing bisphenol A carbonate and resorcinol carbonate units, having ~17-21 mole percent of resorcinol ester (50:50 isophthalate/terephthalate) linkages, ~4-8 mole percent resorcinol carbonate linkages, and about 73-77 mole percent bisphenol A carbonate linkages; Mw = 25,000 to 35,000 grams/mole; can be prepared as described in Comparative Example 2-4 of US 7790292 to Colborn where in the monomer ratios were adjusted accordingly and the p-cumylphenol was added with the BPA. | SABIC |
| PEI1 | Polyetherimide comprising etherimide units derived from diamino phenylene and the bisanhydride of BPA (available as ULTEM 1010) | SABIC |
| PEI2 | Polyetherimide made according to US 9193829 from bisphenol A disodium salt, a bischlorophthalimide, and para-cumyl phenol sodium salt; Mw = 40,000 to 60,000 g/mol as determined by GPC using polystyrene standards. | SABIC |
| Rimar salt | Potassium perfluorobutane sulfonate | Lanxess |

Preparation of Copolymers

The poly(ester-carbonate-carbonate)s ("PEC") in Table 1 were obtained commercially or prepared as described by reacting diacid chlorides of isopithaloyl and tereplthaloyl chloride with bisphenol A (BPA), resorcinol (RS), or PPPBP monomers. The amounts were adjusted according to the desired composition and Mw.

The poly(co-carbonate)s were obtained commercially or prepared from BPA and PPPBP monomers as is known in the art.

The poly(ester-carbonate-carbonate)s ("PECC") such as PPP/BPA poly(ester-carbonates) were prepared according the following exemplary procedure, as described in detail in WO2017/187428. The amounts were adjusted according the desired composition and Mw. To a mixture of methylene chloride (24 L), DI water (6 L), BPA (1567 g, 6.865 mol), p-cumylphenol (168.7 g, 0.7946 mol), triethylamine (TEA, 40 ml), and sodium gluconate (10 g) in a 75-L reactor equipped with mechanical stirring, recirculation line with pH probe, subsurface phosgene addition, chilled glycol condenser, caustic scrubber for exit gas, and caustic solution inlet was added at 760 g/min a solution of PPPBP (2300 g, 5.73 mol) in 1488 g of 33% NaOH g and 3878 g of DI water while a mixture of molten diacid chlorides (1342 g, 6.611 mol of 5050 isophthaloyl and terephthaloyl chloride) were concurrently added at 90 g/min. Aqueous caustic (33 wt. %) was added as needed to prevent the pH from decreasing below 8-9 in the reactor. After the additions were complete, the reactor was stirred at 8 for 5 min. Phosgene (1800 g, 18.1 mol) was added at 80 g/min; and 33 wt. % aqueous caustic was added as needed to maintain pH of 8-9 in the reactor. The reactor was then purged with nitrogen. A sample was taken for GPC analysis. Then 200 of additional phosgene was added to the batch followed by a second GPC analysis. If the difference between the first and second GPC was less than 200 the batch was considered complete. If not the process was repeated. The batch was purified on a centrifuge train where the brine phase was separated and the polymer solution in methylene chloride was extracted with aqueous HCl and then washed with deionized water until titratable chlorides were less than 5 ppm. The methylene chloride solution was then steam precipitated and the polymer dried under hot nitrogen until volatile levels were <0.4 wt %. The copolymer contained less than 100 ppm of each of the monomers. The ionic C; was less than 2 ppm. The residual TEA was less than 4 ppm.

Blending, Extrusion, and Molding Conditions

All the PEI pellets were first ground up to aid in dry blending. All the formulations were then dry blended with the appropriate additives, if any, and mixed in a paint shaker. The blends were extruded on 26 mm twin-screw (T8) extruder with barrel temperatures set points ramped from 540 to 640° F. (feed to die throat), vacuum venting and a screw speed of 300 rpms. The extrudate was cooled in a water bath and then chopped into pellets for testing and molding.

Molding of ASTM Test Parts

A 180-ton injection molding machine with a 5.25 oz. barrel was used to mold ASTM test samples. The polymer blends were molded at 630 to 640'F after drying for 4 hours and at 250° F. with a 35 second cycle time. An oil-thermolator was used to heat cavity and core sides of the mold to a surface temperature of 250° F.

Testing Methods

Weight average molecular weight (Mw) determinations were performed using GPC using a cross linked styrene-divinyl benzene column, at a sample concentration of 1 milligram (mg) per milliliter (mL), and as calibrated with bisphenol A homopolycarbonate standards. Samples were eluted at a flow rate of 1.0 mL/min with methylene chloride as the eluent.

Mole percent of ester units in the copolymers were determined by the integration of the protons in the $^1$H NMR using the following formula:

$$\% \text{ Ester} = 100 \times \frac{(\text{Isophthalate peak at 8.96 ppm}/1) + (\text{terephthalate at 8.33 ppm}/4)}{(BPA + PCP \text{ peak at 1.73 ppm}/6) + (PPP \text{ peak at 8.01 ppm}/1)}$$

Glass transition temperature (Tg) was determined by differential scanning calorimetry (DSC) according to ASTM D3418 with a 20° C./min heating rate.

Multi axial impact (MAI) reported in Joules (J) was determined using 3.2 mm disks according to ISO 6602 or ASTM D3763.

Tensile stress at yield and at break tensile strain at yield and at break were determined according to ASTM D638 at a temperature of 23° C.

Flexural stress at yield and Flexural modulus were determined according to ASTM D790.

Notched Izod values, expressed in units of foot-pounds per inch, were determined according to ASTM D256-08, Method A (notched) and Method E (reversed notched), at a temperature of 73° F. or 23° C., as indicated, a hammer energy of 2 foot-pounds (2.711 joules), and bar dimensions of 3.2 millimeters by 12.7 millimeters by 63 millimeters.

Heat deflection temperature (HDT) was determined on 0.125-inch thick unannealed bars according to ASTM D648 at the pressure indicated.

Coefficient of thermal expansion (CTE) was determined according to ASTM E-831 measured over temperature indicated.

Specific gravity was determined according to ASTM D792.

Melt flow rate (MFR) was determined according to ASTM D1238 at the specified temperature and load over 10 min.

Melt volume rate (MVR) was determined according to ASTM D1238-04 under a load of 6.7 kg at 337° C. and under a load of 2.16 kg at 330° C.

Melt viscosity was determined according to ISO 11443 at the temperatures and rates indicated.

Yellowness index (YI) was determined according to ASTM D1925 on 0.125 inch (in) thick tensile-bars.

Transparency was described by two parameters, percent transmission (% T) and percent haze. Percent transmission and percent haze for laboratory scale samples were determined according to ASTM D1003 using the color space CIE1931 with Illuminant C and a 2° observer on 0.125 inch thick tensile bars.

Vicat B value was determined according to ISO 306, Method B120.

Melt viscosity was determined according to ISO 11443 at the temperatures indicated.

Flammability tests were performed following the procedure of Underwriter's Laboratory Bulletin 94 entitled "Tests for Flammability of Plastic Materials, UL94."

Miscibility was determined by melt blending each combination of polymers and measuring the Tg(s) and haze in the resultant blend. Miscible blends have low haze (less than 2%) and have one Tg between the two Tgs of the starting resins. Compatible (partially miscible) blends still have two Tgs, where both are often shifted toward the average of the Tg of each component. Immiscible blends are typically opaque and have two Tgs.

Preparation of Polymer Blends

Miscibility (compatibility) of blends of the poly(ester-carbonate-carbonate)s (PEC) and poly(ester-carbonate-carbonate)s (PECC) with PEI-1 and BPA-PC are summarized in Table 2.

The PEC and PECC copolymers contain ester units and carbonate units of the formulas

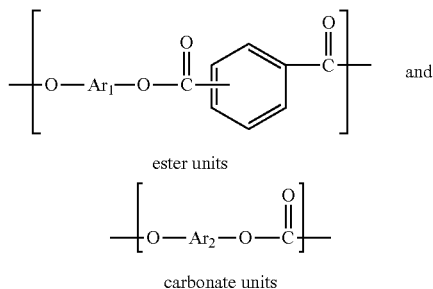

ester units carbonate units where each "Ar" group represents a group derived from bisphenol A (BPA), resorcinol (RS), or PPPBP monomers. In Table 2, "$Ar_1$ Ester" is the type of Ar group in the ester unit and "$Ar_2$ Carbonate" is the type of $Ar_2$ group in the carbonate unit. Further in Table 2 "Ester (mol %) refers to the mole % of ester units in the copolymer based on the total moles of the ester units and carbonate units; and I/T refers to the molar ratio of isophthalate to terephthalate linkages.

TABLE 2

| Name | Polymer | $Ar_1$ Ester | $Ar_2$ Carbonate | Tg (° C.) | Ester (mol %) | I/T | Blend with PEI-1 | Blend with BPA-PC |
|---|---|---|---|---|---|---|---|---|
| PEC1 | BPA poly(ester-carbonate-carbonate) | BPA | BPA | 172 | 52% | 50/50 | Immiscible 2 Tgs Opaque | Miscible 1 Tg Transparent |
| PEC2 | BPA poly(ester-carbonate-carbonate) | BPA | BPA | 172 | 74% | 93/7 | Immiscible 2 Tgs Opaque | Miscible 1 Tg Transparent |

TABLE 2-continued

| Name | Polymer | Ar$_1$ Ester | Ar$_2$ Carbonate | Tg (° C.) | Ester (mol %) | I/T | Blend with PEI-1 | Blend with BPA-PC |
|---|---|---|---|---|---|---|---|---|
| PEC3 | RS poly(ester-carbonate-carbonate) | RS | BPA/RS | 142 | 82% | 50/50 | Miscible 1 Tg Transparent | Immiscible 2 Tgs Opaque |
| PEC4 | RS poly(ester-carbonate-carbonate) | RS | BPA/RS | 145 | 20% | 50/50 | Immiscible 2 Tgs Opaque | Miscible 1 Tg Transparent |
| PCC1 | 33 Mol % PPPBP/BPA copolycarbonate | None | 67% BPA/ 33% PPPBP | 195 | None | None | Immiscible 2 Tgs Opaque | Miscible |
| PCC2 | 45 Mol % PPPBP/BPA copolycarbonate | None | 55% BPA/ 45% PPPBP | 215 | None | None | Immiscible 2 Tgs Opaque | Immiscible 2 Tgs Opaque |
| PECC | PPPBP/BPA poly(ester-carbonate-carbonate) | (Variable) | BPA/PPPBP (Variable) | 220-300 | (Variable) | | Miscible/ Compatible | Miscible/ Compatible |

As can be seen in Table 1, poly(ester-carbonate-carbonate)s PEC1 and PEC2, which contain only BPA groups in the ester units and BPA groups in the carbonate units, were miscible with BPA-PC but immiscible with PEI. Polymers of PEC1 and PEC2 type typically have Tgs in the 170 to 180° C. range. PEC3 and PEC4 include resorcinol (RS) in the ester group and a mixture of resorcinol and BPA in the carbonate units. At high levels of ester (PEC3), the polymer was miscible with PEI but immiscible with BPA-PC. Because PEC3 has a relatively low Tg (142° C.), a blend of PEC3 with PEI has limited usefulness as a high heat composition. At low levels of ester (PEC4), the polymer was immiscible with PEI, but miscible with BPA-PC. Because PEC4 also had a relatively low Tg (145° C.), it also has limited usefulness as a high heat composition.

Copolycarbonates PC1 and PC2 were prepared having varying amounts of PPPBP and BPA in the carbonate unit and having no ester unit. As is shown in Table 1, at 33 mole % PPPBP (PCC1), the copolymer had a Tg of 195° C., and the copolymer was miscible with BPA-PC, but not with PEI. At 45 mole % PPPBP (PCC2), the copolymer had a Tg of 215° C., but was not miscible with BPA-PC or PEI.

PECC represents PPP/BPA poly(ester-carbonate-carbonate)s prepared having a varying molar ratio of PPPBP to BPA and a varying ester unit content as described in Examples 1-29 below. The PPPBP/BPA poly(ester-carbonate-carbonate)s had Tgs in the range of 220 to 300° C. As is reported in Table 2, these PPPBP/BPA poly(ester-carbonate-carbonate)s were found to be miscible and compatible with both PEI and BPA-PC, forming blends with each. These materials are accordingly of interest in high heat applications.

Examples 1-5

A poly(ester-carbonate-carbonate) derived from BPA and PPPBP, having a molar ratio of 64/36 BPA/PPPBP and an ester content of 50 mole % (iso/terephthalate ratio of 50/50) based on the total moles of ester and carbonate units, and an Mw of 18,128 g/mol, was blended with PEI-1 in amounts ranging from 0 to 100 wt % as indicated in Table 3. The blends were subjected to testing. Tensile properties, flexural properties, impact properties, thermal properties, physical properties, and optical properties are reported in Table 3.

TABLE 3

| Ex. No. | E1* | E2 | E3 | E4 | E5 | PEI-1* |
|---|---|---|---|---|---|---|
| PECC (wt %) | 100 | 95 | 75 | 50 | 25 | 0 |
| PEI-1 (wt %) | 0 | 5 | 25 | 50 | 75 | 100 |
| Tensile Properties | | | | | | |
| Tensile stress, yld (MPa) | 81 | 82 | 88 | 96 | 103 | 110 |
| Tensile stress, brk (MPa) | 67 | 66 | 70 | 77 | 90 | 104 |
| Tensile strain, yld (%) | 8.5 | 8.5 | 8.2 | 7.9 | 7.5 | 7 |
| Tensile strain, brk (MPa) | 19 | 21 | 23 | 40 | 81 | 60 |
| Tensile modulus (MPa) | 2518 | 2592 | 2822 | 2994 | 3278 | 3585 |
| Flexural Properties | | | | | | |
| Flexural Stress, yld (MPa) | 117 | 129 | 138 | 150 | 162 | 149 |
| Flexural Modulus (MPa) | 2470 | 2510 | 2690 | 2950 | 3180 | 3420 |
| Impact Properties | | | | | | |
| Izod Impact, rev notch, 73° F. (% Ductile) | 100 | 100 | 100 | 100 | 100 | |
| Izod Impact, rev notch, 73° F. (ft-lbs/in) | 35 | 32 | 39 | 39 | 38 | 25 |
| Notched Izod Impact, 73° F. (ft-lbs/in) | 1.9 | 1.9 | 1.1 | 1.0 | 0.7 | 0.8 |
| MAI Total Energy, 73° F.(J) | 52 | 54 | 22 | 57 | 57 | 60 |

TABLE 3-continued

| Ex. No. | E1* | E2 | E3 | E4 | E5 | PEI-1* |
|---|---|---|---|---|---|---|
| Thermal and Physical Properties | | | | | | |
| HDT, 0.455 MPa, 3.175 mm unannealed (° C.) | 199 | 199 | 200 | 200 | 203 | 205 |
| HDT, 1.82 MPa, 3.175 mm, unannealed (° C.) | 182.6 | 183.6 | 184.3 | 185.7 | 187.6 | 197 |
| CTE, 23 to 150° C., flow | 51-63.57 | 61.1 | 59.2 | 61.9 | 49.9 | 50.0 |
| CTE, 23 to 150° C., crossflow | 53-66.95 | 62.6 | 58.4 | 55.7 | 49.7 | 50.0 |
| Specific gravity (g/cc) | 1.22 | 1.22 | 1.23 | 1.25 | 1.27 | 1.27 |
| Flow Properties | | | | | | |
| MVR, 337° C./6.7 kgf (cm$^3$/10 min) | 38 | 27 | 32 | 27 | 23 | 14 |
| Optical Properties | | | | | | |
| YI | 31 | 32 | 75 | 85 | 68 | |
| % T | 80 | 80 | 50 | 44 | 69 | |
| % Haze | 1.4 | 1.3 | 36.1 | 42.1 | 3.5 | 1.0 |

*Comparative

As can be seen in Table 3, PPPBP/BPA poly(ester-carbonate-carbonate) blends with PEI-1 demonstrated a superior balance of properties. For instance, the melt flow of the blends increased compared to PEI-1 alone. With increasing poly(ester-carbonate-carbonate) in the blends, increased toughness (as reflected by Izod values) was also obtained. Combining the poly(ester-carbonate-carbonate) with PEI-1 afforded improved heat, strength, and modulus compared to the poly(ester-carbonate-carbonate) (C). Some of the blends, for instance E2 and E5, demonstrated a high degree of transparency.

Transparency of poly(ester-carbonate-carbonate)/PEI blends in a ratio of 75 wt % PC to 25 wt % PEI was plotted in FIG. 1 in a chart of Mol % PPPBP versus Mol % Ester.

As can be seen in FIG. 1, some of the blends demonstrated low levels of haze (haze values 0 to 3) and high levels of transparency.

Examples 6-29

PPPBP/BPA poly(ester-carbonate-carbonate)s (PECC) were prepared from BPA and PPPBP having varying molar percentages of PPPBP, BPA, and ester units as indicated in Table 4. The mole % of PPPBP is relative to the total moles of BPA and PPPBP in the poly(ester-carbonate-carbonate), and the mole % of ester is relative to the total number of carbonate units and ester units. These PPPBP/BPA poly(ester-carbonate-carbonate)s were blended with PEI-1 in a ratio of 75 wt % PECC to 25 wt % PEI.

TABLE 4

| | PECC | | | MVR | | HDT | | | | | |
|---|---|---|---|---|---|---|---|---|---|---|---|
| Ex. No. | mole % PPPBP | mole % Ester | MW (g/mol) | 337° C., 6.7 Kg (cm$^3$/10 min) | DSC (° C.) | 1.82 MPa (° C.) | NII (J/m) | MAI Energy, Total (J) | YI | % T | % Haze |
| E6 | 25.5 | 90 | 21,000 | 19.8 | 212 | 186 | 37 | 79.4 | 72.5 | 64.3 | 1.8 |
| E7 | 25.5 | 90 | 28,000 | 15.1 | 213 | 189 | 42 | 78 | 70.9 | 65.3 | 1.7 |
| E8 | 38 | 31 | 21,000 | 24.0 | 213 | 185 | 36 | 62 | 132.3 | 14.1 | opaque |
| E9* | 42 | 44 | 19,000 | 17.1 | 215 | 184 | 33 | 59.8 | 105.9 | 37.5 | 26 |
| E10* | 42 | 44 | 23,000 | 15.2 | 215 | 187 | 33 | 81.6 | 86.1 | 49.6 | 20.2 |
| E11 | 42 | 58 | 21,667 | 23.0 | 218 | 189 | 33 | 32.8 | 74.5 | 63 | 1.8 |
| E12 | 44.64 | 55 | 21,000 | 17.5 | 216 | 188 | 30 | 20.2 | 72.4 | 64.5 | 2.1 |
| E13 | 46 | 44 | 19,000 | 17.8 | 214 | 187 | 34 | 65.7 | 74.6 | 61.8 | 2 |
| E14 | 46 | 52 | 19,000 | 18.1 | 216 | 187 | 117 | 88.7 | 64.2 | 69.5 | 1.7 |
| E15 | 46 | 52 | 23,000 | 14.4 | 216 | 187 | 150 | 50 | 72.9 | 64.2 | 1.7 |
| E16 | 46 | 58 | 19,000 | 16.3 | 216 | 189 | 50 | 80.5 | 70.7 | 65.8 | 1.8 |
| E17 | 46 | 58 | 23,000 | 14.3 | 216 | 187 | 54 | 61.1 | 74.4 | 63.4 | 2.2 |
| E18 | 48 | 50 | 21,000 | 17.3 | 216 | 189 | 34 | 48.2 | 75.1 | 63 | 1.7 |
| E19 | 48 | 55 | 17,636 | 18.6 | 216 | | 57 | 35.8 | 64.6 | 69.1 | 2 |
| E20 | 48 | 55 | 21,000 | 15.8 | 216 | 188 | 54 | 40.8 | 65.8 | 68.2 | 2.6 |
| E21 | 48 | 55 | 21,000 | 15.5 | 216 | 190 | 53 | 70.5 | 65.2 | 68.9 | 2.1 |
| E22 | 48 | 55 | 21,000 | 15.9 | 216 | 213 | 54 | 71.1 | 65.2 | 68.9 | 2.1 |
| E23 | 48 | 55 | 24,364 | 14.0 | 217 | 189 | 56 | 67.5 | 65.3 | 68.9 | 1.8 |
| E24 | 48 | 60 | 21,000 | 14.2 | 216 | 191 | 37 | 47 | 75.2 | 62.6 | 1.8 |
| E25 | 50 | 52 | 19,000 | 13.9 | 215 | 188 | 44 | 51.7 | 72.9 | 64.3 | 1.8 |
| E26 | 50 | 52 | 23,000 | 15.0 | 216 | 188 | 187 | 30.9 | 72.5 | 64.2 | 2 |
| E27 | 50 | 58 | 19,000 | 14.4 | 216 | 189 | 53 | 90.5 | 72.2 | 64.7 | 1.7 |
| E28 | 50 | 58 | 23,000 | 16.7 | 217 | 188 | 50 | 55.9 | 91 | 55.3 | 2.1 |
| E29 | 51.36 | 55 | 21,000 | 15.1 | 216 | 192 | 37 | 69.7 | 74.4 | 62.9 | 1.6 |

*Comparative

Table 4 shows the effect of varying the amount of PPPBP and the amount of ester in the PECC, versus the properties of the PECC-PEI blends. In general, the best compatibility or transparency is obtained when the product of the mole % of PPPBP times the mole % of ester is at least 2000. However, as shown by Examples E2 and E5 in Table 3, this condition is not necessary.

Examples 30-35

Blended compositions were also made with PECC and PEI as shown in Table 5, where the amount of each component is in weight percent. The PECC used in the blended composition was derived from BPA and PPPBP, had a BPA/PPPBP mole ratio of 54/46, 52 mole % of ester units, and an MW of 19,300 g/mol. Each of the compositions in Table 5 and Table 6 further contained pentaerythritol tetrastearate in an amount of 0.27 parts by weight per hundred parts by weight of the polymer (phr) and phosphate stabilizer in an amount of 0.08 phr. E32 and E35 further contained Rimar salt in an amount of 0.1 phr.

TABLE 5

| Ex. No. | E30* | E31 | E32 | E33* | E34 | E35 |
|---|---|---|---|---|---|---|
| Composition | 100% PEI-2 | 75% PEI-2 25% PECC | 75% PEI-2 25% PECC Rimar salt | 100% PEI-1 | 75% PEI-1 25% PECC | 75% PEI-1 25% PECC Rimar salt |
| Tensile properties | | | | | | |
| Tensile stress, yld (MPa) | 106 | 101 | 100 | 108 | 102 | 102 |
| Tensile stress, brk (MPa) | 93.6 | 85.4 | 79.7 | 95.4 | 91.3 | 92 |
| Tensile strain, yld (%) | 7.0 | 7.4 | 7.4 | 7.0 | 7.4 | 7.4 |
| Tensile strain, brk (%) | 63 | 61 | 56 | 86 | 71 | 72 |
| Tensile modulus, (MPa) | 3286 | 3144 | 3114 | 3290 | 3150 | 3186 |
| Flexural properties | | | | | | |
| Flexural Stress, yld (MPa) | 168 | 158 | 158 | 170 | 159 | 159 |
| Flexural Modulus (MPa) | 3350 | 3160 | 3180 | 3370 | 3200 | 3190 |
| Izod Impact | | | | | | |
| Izod Impact, rev notch, 23° C. (% Ductile) | 0 | 100 | 100 | 0 | 100 | 100 |
| Izod Impact, rev notch, 23° C. (J/m) | 1140 | NB** | NB | 1200 | NB | NB |
| Notched Izod Impact, 23° C. (J/m) | 46 | 54 | 50 | 50 | 53 | 51 |
| Instrumented Impact | | | | | | |
| MAI (% Ductile) | NA*** | 0 | 40 | 0 | 60 | 20 |
| MAI Total Energy, 23° C. (J) | NA | 64 | 64 | 79 | 79 | 65 |
| Thermal Properties | | | | | | |
| HDT, 1.84 MPa (° C.) | 189 | 190 | 188 | 189 | 189 | 188 |
| Tg, DSC 20° C./min (° C.) | 217 | 216 | 214.5 | 217 | 215 | 215 |
| Vicat Temp, Rate B/50 (° C.) | 210 | 209 | 209 | 211 | 210 | 209 |
| Vicat Temp, Rate B/120 (° C.) | 212 | 211 | 210 | 212 | 211 | 211 |
| Melt Viscosity and Flow | | | | | | |
| MVR, 330° C./2.16 kg (cm³/10 min) | 3.5 | 3.8 | 3.8 | 3.6 | 3.4 | 4.0 |
| MVR, 337° C./6.7 kgf (cm³/10 min) | 16.6 | 17.3 | 17.7 | 17.3 | 15.6 | 18.8 |
| Melt Viscosity at 641 1/s | | | | | | |
| 330° C. | 1085 | 1078 | 1075 | 1179 | 1146 | 1100 |
| 350° C. | 664 | 684 | 691 | 707 | 709 | 655 |
| 370° C. | 410 | 431 | 437 | 439 | 445 | 408 |
| Physical properties | | | | | | |
| Specific gravity(g/cc) | 1.28 | 1.27 | 1.27 | 1.28 | 1.27 | 1.27 |
| Optical properties (0.125 inch tensile bars) | | | | | | |
| YI | 115 | 99 | 101 | 80 | 67 | 71 |
| %T | 41 | 53 | 53 | 53 | 68 | 66 |
| % Haze | 0.5 | 0.4 | 0.5 | 0.4 | 0.4 | 0.4 |
| Flame retardance (UL-94, 1.5 mm thickness) | | | | | | |
| 23° C., 48 hr | V0 | V1 | V0 | V0 | V1 | V0 |
| 70° C., 168 hr | V0 | V1 | V0 | V0 | V2 | V0 |

*Comparative
**NB is the sample did not break.
***NA is data not available.

Table 5 shows that the compositions had excellent transparency, i.e. a haze of 0.4 to 0.5. The toughness of the blends as measured by reverse notched Izod showed a significant increase of the blends over the PEI controls. In addition, the heat performance of the blends was comparable to the PEI control. Samples with added Rimar salt exhibited V0 performance at 1.5 mm in thickness.

The long term heat aging performance of the polymers and blends were measured by the % Mw change in an air circulating oven at 190° C. Pellet samples of the blends E31 and E34 were compared to the pellet samples of the PEC resin used to make the blends in Table 5. The samples were aged for 1992 hours and the % Mw loss is reported in Table 6.

TABLE 6

| Sample # | Composition | % Mw Loss |
|---|---|---|
| PECC | 100% PECC | 82 |
| E31 | 75/25 PEI/PECC | 27 |
| E34 | 75/25 PEI/PECC | 20 |

As shown in Table 6, blends E31 and E34 lost less than 30% of their Mw whereas PECC lost over 80% of its Mw under the same conditions.

The invention is further illustrated by the following non-limiting aspects.

Aspect 1. A polymer blend, comprising: 5 to 95 weight percent of a poly(ester-carbonate-carbonate) comprising 40 to 95 mole percent of ester units comprising low heat bisphenol groups and high heat bisphenol groups, wherein the ester units comprise 20 to 80 mole percent of the low heat bisphenol groups and 20 to 80 mole percent of the high heat bisphenol groups, based on the total moles of ester units in the poly(ester-carbonate-carbonate), and 5 to 60 mole percent of carbonate units comprising the low heat bisphenol groups and the high heat bisphenol groups, wherein the carbonate units comprise 20 to 80 mole percent of the low heat bisphenol groups and 20 to 80 mole percent of the high heat bisphenol groups, based on the total moles of carbonate units in the poly(ester-carbonate-carbonate); and 5 to 95 weight percent of a poly(etherimide), wherein the weight percent of each polymer is based on the total weight of the polymers in the blend, and a molded 0.125-inch thick ASTM tensile bar comprising the polymer blend has a haze value of less than 25% as determined according to ASTM D1003 using the color space CIE1931 with Illuminant C and a 2° observer.

Aspect 2. The polymer blend of aspect 1, wherein compared to the poly(ester-carbonate-carbonate) alone, a composition comprising the polymer blend has at least one of an improved heat deflection temperature, a higher glass transition temperature, an improved strength, or an improved modulus; and compared to the polyetherimide alone, a composition comprising the polymer blend has at least one of a higher melt flow, or a higher impact strength.

Aspect 3. The polymer blend of any of the preceding aspects, having at least one of a single glass transition temperature of 200 to 240° C. determined using scanning calorimetry according to ASTM D3418 with a 20° C./min heating rate; a melt volume rate of 15 to 20 cm³/10 minutes determined according to ASTM D1238 at 337° C. and a 6.7 kilogram load with an equilibration time of 360 seconds; a heat deflection temperature of 180 to 195° C. determined using a 0.125 inch thick unannealed bar according to ASTM D648 at a pressure of 1.82 MPa; or a flexural modulus of greater than or equal to 2500 MPa determined using a 0.125 inch thick unannealed bar according to ASTM D790. The polymer blend of any of the preceding aspects, wherein a molded sample comprising the polymer blend has at least one of a coefficient of thermal expansion determined according to ASTM E-831 of 49 to 62 measured cross flow over a temperature of 23 to 150° C.; a haze of less than 10, or less than 3 determined on a measured according to ASTM D1003 using the color space CIE1931 with Illuminant C and a 2° observer at a 0.125 inch thickness; or greater than or equal to 70% transmission determined according to ASTM D1003 using the color space CIE1931 with Illuminant C and a 2° observer at a 0.125 inch thickness.

Aspect 4. The polymer blend of any of the preceding aspects, wherein a multiplication product of the mole percent of the ester units and the mole percent of the high heat monomer groups in the poly(ester-carbonate-carbonate) is greater than 1800, or greater than 2000, and a composition comprising the polymer blend has a haze of less than 3 and greater than or equal to 70% transmission each determined according to ASTM D1003 using the color space CIE1931 with Illuminant C and a 2° observer at a 0.125 mm thickness. For example, the poly(ester-carbonate-carbonate) and the polyetherimide have a weight ratio of from 4:1 to 1:2, and a multiplication product of the mole percent of the ester units and the mole percent of the high heat monomer groups in the poly(ester-carbonate-carbonate) is greater than 2000, or the poly(ester-carbonate-carbonate) and the polyetherimide have a weight ratio of greater than 4:1 or less than 1:2, and a multiplication product of the mole percent of the ester units and the mole percent of the high heat monomer groups in the poly(ester-carbonate-carbonate) is greater than 1800.

Aspect 5. The polymer blend of any of the preceding aspects, wherein a molded sample comprising the polymer blend retains 70% to 100% of its weight average molecular weight after heating in an air circulating oven at 190° C. for 1992 hours.

Aspect 6. The polymer blend of any of the preceding aspects, wherein the poly(ester-carbonate-carbonate) has a weight average molecular weight of 18,000 to 24,000 grams/mole, as measured by gel permeation chromatography using a crosslinked styrene-divinylbenzene column and calibrated to bisphenol A homopolycarbonate references.

Aspect 7. The polymer blend of any of the preceding aspects, wherein the ester units are of the formula

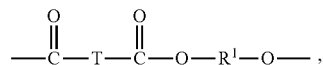

wherein T is a $C_{2-20}$ alkylene, a $C_{6-20}$ cycloalkylene, or a $C_{6-20}$ arylene, and each $R^1$ is independently the low heat bisphenol group or the high heat monomer group; and the carbonate units are of the formula,

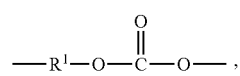

wherein each $R^1$ is independently the low heat bisphenol group or the high heat monomer group.

Aspect 8. The polymer blend of aspect 7, wherein T comprises isophthaloyl groups, terephthaloyl groups, or a combination comprising at least one of the foregoing, and wherein $R^1$ comprises bisphenol A, bisphenol AF, bisphenol B, bisphenol C, bisphenol C2, bisphenol E, bisphenol F, bisphenol G, or bisphenol S groups and phthalimidine groups of the formula

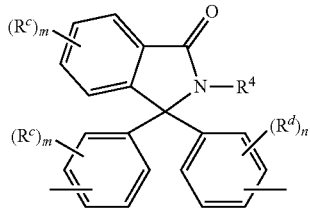

wherein $R^c$ and $R^d$ are each independently a $C_{1-12}$ alkyl, $C_{1-12}$ alkenyl, $C_{3-8}$ cycloalkyl, or $C_{1-12}$ alkoxy, m and n are each independently 0 to 4, and $R^4$ is hydrogen, $C_{2-6}$ alkyl, or phenyl optionally substituted with 1 to 5 $C_{1-6}$ alkyl groups; more preferably wherein the phthalimidine groups are of the formula

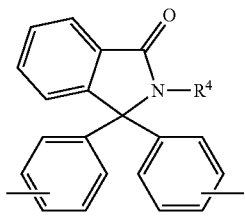

wherein $R^4$ is hydrogen, methyl, or phenyl, most preferably wherein the phthalimidine groups are of the formula

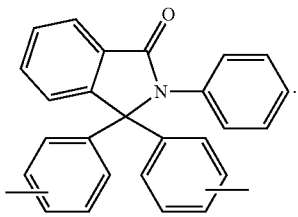

Aspect 9. The polymer blend of any of the preceding aspects, wherein low heat groups are bisphenol A groups and the high heat groups are phthalimidine groups of the formula

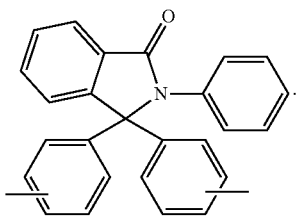

Aspect 10. The polymer blend of any of the preceding aspects, wherein the polyetherimide comprise 2 to 1000 or 5 to 500 structural units of the formula (18) wherein T is a group of the formula —O—Z—O—, each Z is independently a divalent group of the formula

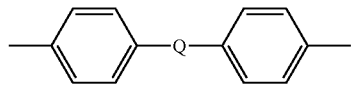

wherein Q is —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5; and each R is independently

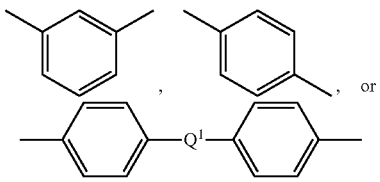

wherein $Q^1$ is —O—, —S—, —C(O)—, —SO$_2$—, —SO—, —P(R$^d$)(=O)— wherein R$^d$ is a $C_{1-8}$ alkyl or $C_{6-12}$ aryl, —C$_y$H$_{2y}$— wherein y is an integer from 1 to 5, or —(C$_6$H$_{10}$)$_z$— wherein z is an integer of 1 to 4.

Aspect 11. The polymer blend of any of the preceding aspects, wherein Z comprises bisphenol A groups and R comprises m-phenylene, p-phenylene, bis(4,4'-phenylene)sulfone, bis(3,4'-phenylene)sulfone, bis(3,3'-phenylene)sulfone, or a combination comprising at least one of the foregoing.

Aspect 12. The polymer blend of any of the preceding aspects, wherein Z comprises bisphenol A groups and R comprises m-phenylene, p-phenylene, bis(4,4'-phenylene)sulfone, bis(3,4'-phenylene)sulfone, bis(3,3'-phenylene)sulfone, or a combination comprising at least one of the foregoing; and bisphenol A groups and the high heat groups are phthalimidine groups of the formula

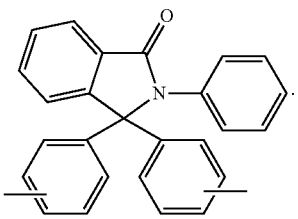

Aspect 13. The polymer blend of any of the preceding aspects, further comprising a filler, flame retardant, heat stabilizer, ultraviolet light stabilizer, mold release agent, lubricant, processing aid, dye, pigment, or a combination thereof; optionally further comprising a flame retardant, wherein a composition comprising the polymer blend a V0 rating determined according to UL 94 at a thickness of 1.5 millimeters.

Aspect 14. The polymer blend of any of the preceding aspects, further comprising potassium perfluorobutane sulfonate.

Aspect 15. The polymer blend of any of the preceding aspects, wherein Z comprises bisphenol A groups and R comprises m-phenylene, p-phenylene, bis(4,4'-phenylene)sulfone, bis(3,4'-phenylene)sulfone, bis(3,3'-phenylene)sulfone, or a combination comprising at least one of the foregoing; and bisphenol A groups and the high heat groups are phthalimidine groups of the formula

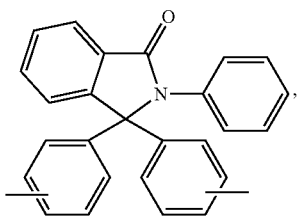

and the polymer blend further comprises potassium perfluorobutane sulfonate.

Aspect 16. An article comprising the polycarbonate blend of any of the preceding aspects, preferably wherein the article is a metallized article, injection-molded article, or extruded article, more preferably wherein the article is a heat reflector, light reflector, component of a medical device, food tray, food dish, or optical connector.

The compositions, methods, and articles disclosed herein can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function and/or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least one embodiment described herein, and may or may not be present in other embodiments. The described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs. All cited patents, patent applications, and other references are incorporated herein by reference in their entirety. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polymer blend, comprising
5 to 95 weight percent of a poly(ester-carbonate-carbonate) comprising
40 to 95 mole percent of ester units comprising low heat bisphenol groups and high heat bisphenol groups, wherein the ester units comprise 20 to 80 mole percent of the low heat bisphenol groups and 20 to 80 mole percent of the high heat bisphenol groups, based on the total moles of ester units in the poly(ester-carbonate-carbonate), and
5 to 60 mole percent of carbonate units comprising the low heat bisphenol groups and the high heat bisphenol groups,
wherein the carbonate units comprise 20 to 80 mole percent of the low heat bisphenol groups and 20 to 80 mole percent of the high heat bisphenol groups, based on the total moles of carbonate units in the poly(ester-carbonate-carbonate); and
5 to 95 weight percent of a poly(etherimide), wherein
the weight percent of each polymer is based on the total weight of the polymers in the blend, and
a molded 0.125-inch thick ASTM tensile bar comprising the polymer blend has a haze value of less than 25% as determined according to ASTM D1003 using the color space CIE1931 with illuminant C and a 2° observer, and
wherein when the poly(ester-carbonate-carbonate) and the polyetherimide have a weight ratio of from 4:1 to 1:2, a multiplication product of the mole percent of the ester units and the mole percent of the high heat bisphenol groups in the poly(ester-carbonate-carbonate) is greater than 2000, and
when the poly(ester-carbonate-carbonate) and the polyetherimide have a weight ratio of greater than 4:1 or less than 1:2, a multiplication product of the mole percent of the ester units and the mole percent of the high heat bisphenol groups in the poly(ester-carbonate-carbonate) is greater than or equal to 1800.

2. The polymer blend of claim 1, wherein
compared to the poly(ester-carbonate-carbonate) alone, a composition comprising the polymer blend has at least one of
an improved heat deflection temperature,
a higher glass transition temperature,
an improved strength, or
an improved modulus; and
compared to the polyetherimide alone, a composition comprising the polymer blend has at least one of
a higher melt flow, or
a higher impact strength.

3. The polymer blend of claim 1, having at least one of
a single glass transition temperature of 200 to 240° C. determined using scanning calorimetry according to ASTM D3418 with a 20° C./min heating rate;
a melt volume rate of 15 to 20 cm$^3$/10 minutes determined according to ASTM D1238 at 337° C. and a 6.7 kilogram load with an equilibration time of 360 seconds;
a heat deflection temperature of 180 to 195° C. determined using a 0.125 inch thick unannealed bar according to ASTM D648 at a pressure of 1.82 MPa; or
a flexural modulus of greater than or equal to 2500 MPa determined using a 0.125 inch thick unannealed bar according to ASTM D790.

4. The polymer blend of claim 1, wherein a molded sample comprising the polymer blend has at least one of
a coefficient of thermal expansion determined according to ASTM E-831 of 49 to 62 measured cross flow over a temperature of 23 to 150° C.;

a haze of less than 10, or less than 3 determined on a measured according to ASTM D1003 using the color space CIE1931 with Illuminant C and a 2° observer at a 0.125 inch thickness; or greater than or equal to 70% transmission determined according to ASTM D1003 using the color space CIE1931 with Illuminant C and a 2° observer at a 0.125 inch thickness.

5. The polymer blend of claim 1, wherein
a composition comprising the polymer blend has a haze of less than 3 and greater than or equal to 70% transmission each determined according to ASTM D1003 using the color space CIE1931 with illuminant C and a 2° observer at a 0.125 mm thickness.

6. The polymer blend of claim 1, wherein a molded sample comprising the polymer blend retains 70% to 100% of its weight average molecular weight after heating in an air circulating oven at 190° C. for 1992 hours.

7. The polymer blend of claim 1, wherein
the ester units are of the formula

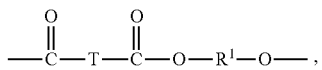

wherein T is a $C_{2-20}$ alkylene, a $C_{6-20}$ cycloalkylene, or a $C_{6-20}$ arylene, and each $R^1$ is independently the low heat bisphenol group or the high heat bisphenol group; and
the carbonate units are of the formula,

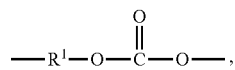

wherein each $R^1$ is independently the low heat bisphenol group or the high heat monomer bisphenol group.

8. The polymer blend of claim 7,
wherein T comprises isophthaloyl groups, terephthaloyl groups, or a combination comprising at least one of the foregoing, and
wherein $R^1$ comprises a divalent group derived from bisphenol A, bisphenol AF, bisphenol B, bisphenol C, bisphenol C2, bisphenol E, bisphenol F, bisphenol G, or bisphenol S groups and phthalimidine groups of the formula

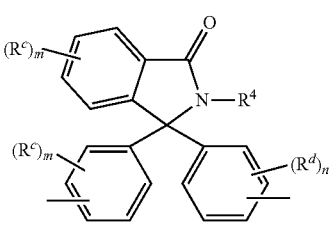

wherein $R^c$ and $R^d$ are each independently a $C_{1-12}$ alkyl, $C_{2-12}$ alkenyl, $C_{3-8}$ cycloalkyl, or $C_{1-12}$ alkoxy, m and n are each independently 0 to 4, and $R^4$ is hydrogen, $C_{2-6}$ alkyl, or phenyl optionally substituted with 1 to 5 $C_{1-6}$ alkyl groups.

9. The polymer blend of claim 1, wherein the low heat bisphenol groups are bisphenol A groups and the high heat bisphenol groups are phthalimidine groups of the formula

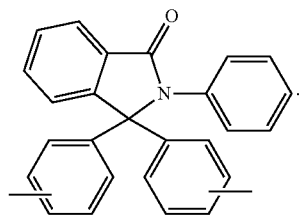

10. The polymer blend of claim 1, wherein the polyetherimide comprise 2 to 1000 structural units of the formula

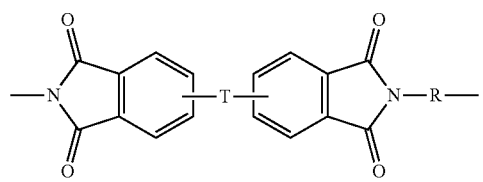

wherein T is a group of the formula —O—Z—O—, and
each Z is independently a divalent group of the formula

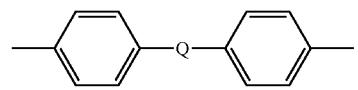

wherein Q is —O—, —S—, —C(O)—, —SO$_2$—, —SO—, —P($R^a$)(=O)— wherein $R^a$ is a $C_{1-8}$ alkyl or $C_{6-12}$ aryl, or —$C_yH_{2y}$— wherein y is an integer from 1 to 5; and
each R is independently

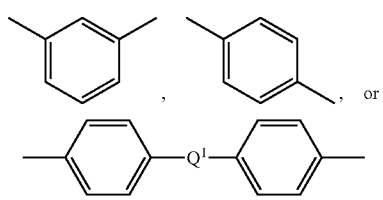

wherein $Q^1$ is —O—, —S—, —C(O)—, —SO$_2$—, —SO—, —P($R^d$)(=O)— wherein $R^d$ is a $C_{1-8}$ alkyl or $C_{6-12}$ aryl, —$C_yH_{2y}$— wherein y is an integer from 1 to 5, or —$(C_6H_{10})_z$— wherein z is an integer of 1 to 4.

11. The polymer blend of claim 10, wherein Z comprises bisphenol A groups and R comprises m-phenylene, p-phenylene, bis(4,4'-phenylene)sulfone, bis(3,4'-phenylene)sulfone, bis(3,3'-phenylene)sulfone, or a combination comprising at least one of the foregoing.

12. The polymer blend of claim 1,
further comprising a filler, flame retardant, heat stabilizer, ultraviolet light stabilizer, mold release agent, lubricant, processing aid, dye, pigment, or a combination thereof.

13. The polymer blend of claim 1, further comprising potassium perfluorobutane sulfonate.

14. An article comprising the polymer blend of claim 1.

15. The article of claim 14, wherein the article is a heat reflector, light reflector, component of a medical device, food tray, food dish, or optical connector.

16. The polymer blend of claim 8, claim 1, wherein the phthalimidine groups are of the formula

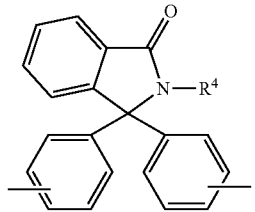

wherein $R^4$ is hydrogen, methyl, or phenyl.

17. The polymer blend of claim 8, wherein the phthalimidine groups are of the formula

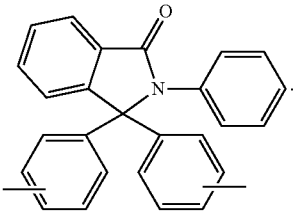

18. The polymer blend of claim 1 further comprising a flame retardant, wherein a composition comprising the polymer blend a V0 rating determined according to UL 94 at a thickness of 1.5 millimeters.

19. The article of claim 14, wherein the article is a metallized article, injection-molded article, or extruded article.

* * * * *